(12) United States Patent
Shih et al.

(10) Patent No.: US 12,108,479 B2
(45) Date of Patent: Oct. 1, 2024

(54) METHOD AND APPARATUS FOR NEW DATA ARRIVAL OF SMALL DATA TRANSMISSION IN A WIRELESS COMMUNICATION SYSTEM

(71) Applicant: ASUSTek Computer Inc., Taipei (TW)

(72) Inventors: Tun-Huai Shih, Taipei (TW); Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 516 days.

(21) Appl. No.: 17/471,735

(22) Filed: Sep. 10, 2021

(65) Prior Publication Data
US 2022/0095410 A1    Mar. 24, 2022

Related U.S. Application Data

(60) Provisional application No. 63/081,448, filed on Sep. 22, 2020, provisional application No. 63/081,443, filed on Sep. 22, 2020.

(51) Int. Cl.
*H04W 76/27* (2018.01)
*H04W 74/0833* (2024.01)

(52) U.S. Cl.
CPC ....... *H04W 76/27* (2018.02); *H04W 74/0833* (2013.01)

(58) Field of Classification Search
CPC . H04W 76/27; H04W 74/0833; H04W 76/10; H04W 76/02; H04W 4/70; H04W 72/04; H04W 72/12; H04W 5/0044; H04L 5/0091
See application file for complete search history.

(56) References Cited

U.S. PATENT DOCUMENTS

| 2021/0144742 A1* | 5/2021 | Jeon | H04L 41/06 |
| 2021/0337625 A1* | 10/2021 | Tsai | H04W 76/19 |
| 2022/0132596 A1* | 4/2022 | Jeon | H04W 74/0866 |
| 2022/0322482 A1* | 10/2022 | Xu | H04W 76/27 |

FOREIGN PATENT DOCUMENTS

| CN | 111800886 | 10/2020 |
| WO | 2020034325 | 2/2020 |

OTHER PUBLICATIONS

Subsequent Transmission of Small data in INACTIVE Aug. 17-28, 2020 (Year: 2020).*
Office Action from SIPO in corresponding Application No. 202111061006.6, dated Jul. 19, 2023.
MediaTek Inc., "Subsequent Transmission of Small data in INACTIVE", Document for Discussion and decision, Agenda Item: 8.6.2, R2-2006830, 3GPP TSG-RAN WG2 Meeting #111 electronic Online, Aug. 17-28, 2020.

* cited by examiner

*Primary Examiner* — Mewale A Ambaye
(74) *Attorney, Agent, or Firm* — Blue Capital Law Firm, P.C.

(57) ABSTRACT

A method and device are disclosed from the perspective of a User Equipment (UE). In one embodiment, the UE initiates a Small Data Transmission (SDT) procedure in RRC_INACTIVE state. Furthermore, the UE transmits a Radio Resource Control (RRC) message to network in response to arrival of a first data, to be transmitted to the network, during the SDT procedure, wherein the first data is not allowed to be transmitted via the SDT procedure.

20 Claims, 17 Drawing Sheets

METHOD AND APPARATUS FOR NEW DATA ARRIVAL OF SMALL DATA TRANSMISSION IN A WIRELESS COMMUNICATION SYSTEM

CROSS-REFERENCE TO RELATED APPLICATIONS

The present Application claims the benefit of U.S. Provisional Patent Application Ser. Nos. 63/081,443 and 63/081,448 filed on Sep. 22, 2020, the entire disclosures of which are incorporated herein in their entirety by reference.

FIELD

This disclosure generally relates to wireless communication networks, and more particularly, to a method and apparatus for new data arrival of small data transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a User Equipment (UE). In one embodiment, the UE initiates a Small Data Transmission (SDT) procedure in RRC_INACTIVE state. Furthermore, the UE transmits a Radio Resource Control (RRC) message to a network in response to arrival of a first data, to be transmitted to the network, during the SDT procedure, wherein the first data is not allowed to be transmitted via the SDT procedure.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: RP-193252, "Work Item on NR small data transmissions in INACTIVE state", ZTE Corporation; 3GPP RAN2 #111 meeting minutes; TS 38.321 V16.1.0, "NR, Medium Access Control (MAC) protocol specification"; TS 38.331 V15.8.0, "NR, Radio Resource Control (RRC) protocol specification"; and R2-2007449, "Details of RRC-based IDT", ZTE Corporation, Sanechips. The standards and documents listed above are hereby expressly incorporated by reference in their entirety.

Figure 1:
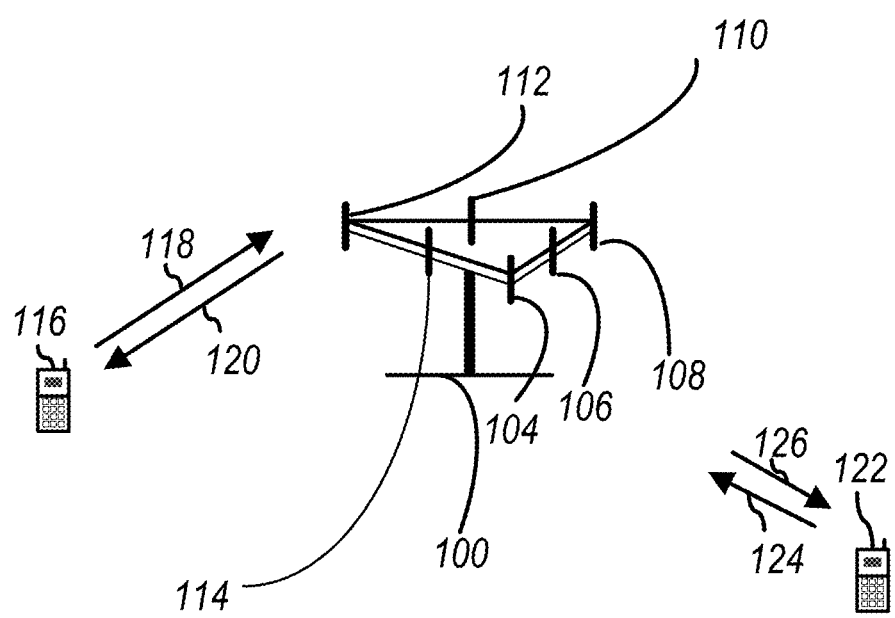
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
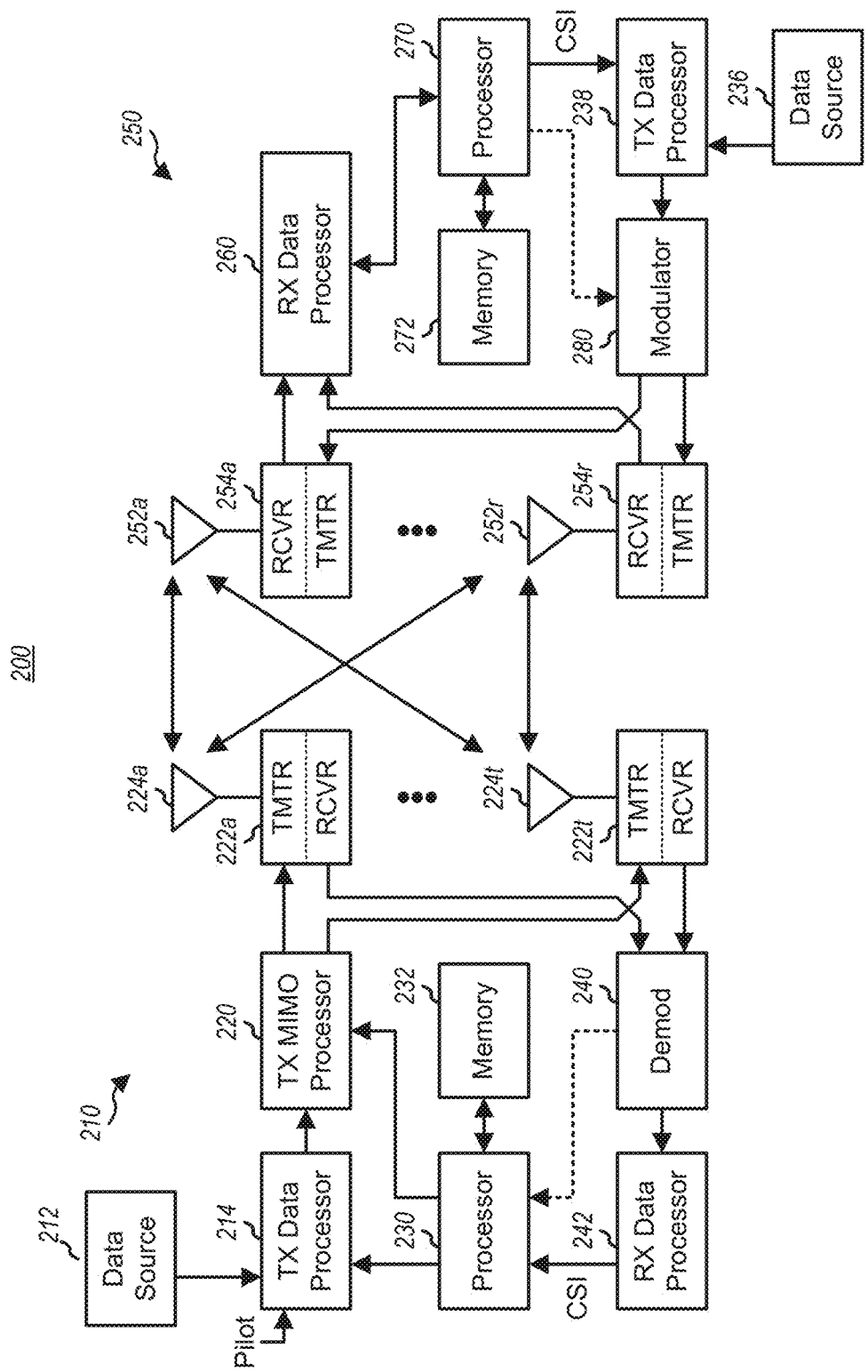
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
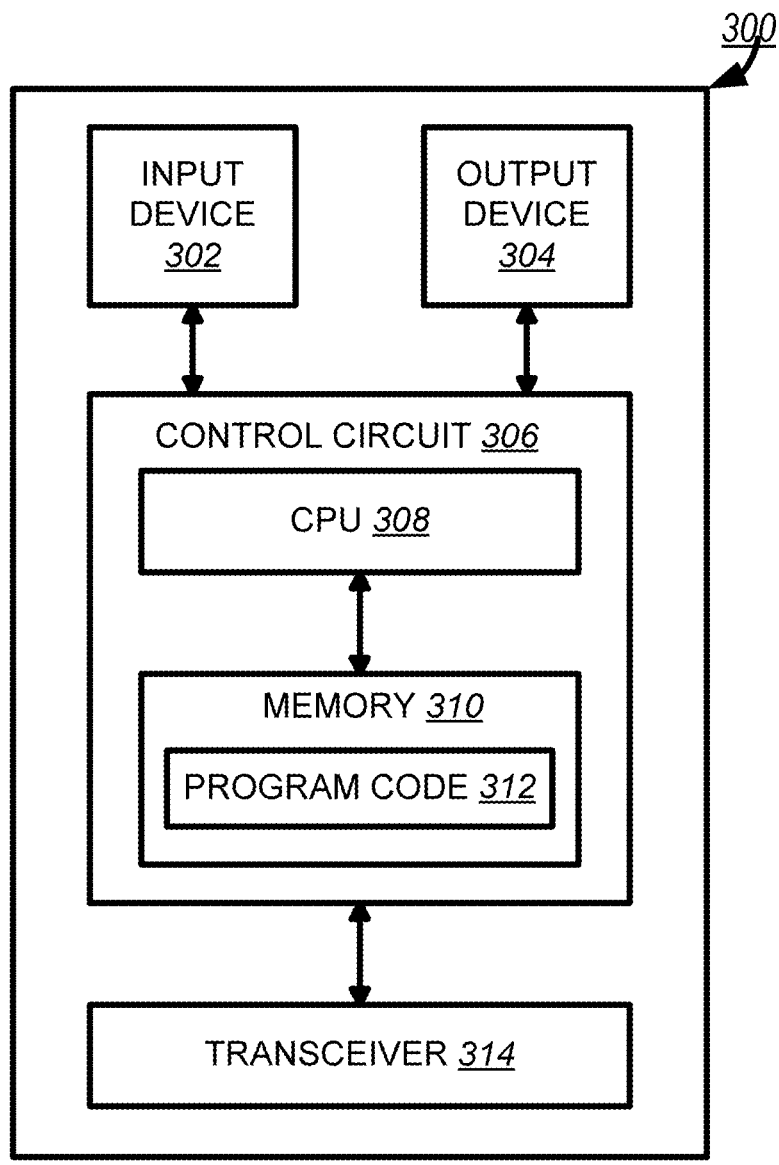
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
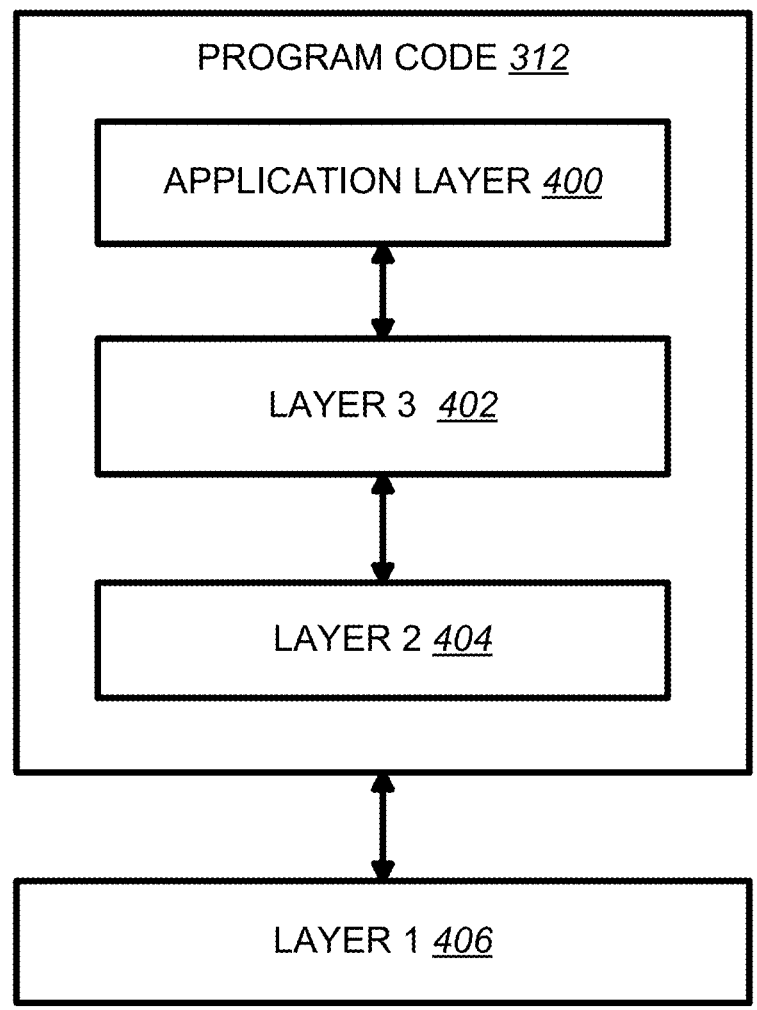
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP RP-193252 and 3GPP RAN2 #111 meeting minutes provide the following description related to NR small data transmissions in RRC_INACTIVE state:
[From 3GPP RP-193252:]

3 Justification

NR supports RRC_INACTIVE state and UEs with infrequent (periodic and/or non-periodic) data transmission are generally maintained by the network in the RRC_INACTIVE state. Until Rel-16, the RRC_INACTIVE state doesn't support data transmission. Hence, the UE has to resume the connection (i.e. move to RRC_CONNECTED state) for any DL (MT) and UL (MO) data. Connection setup and subsequently release to INACTIVE state happens for each data transmission however small and infrequent the data packets are. This results in unnecessary power consumption and signalling overhead.
Specific examples of small and infrequent data traffic include the following use cases:
  Smartphone applications:
  Traffic from Instant Messaging services (whatsapp, QQ, wechat etc)
  Heart-beat/keep-alive traffic from IM/email clients and other apps
  Push notifications from various applications
  Non-smartphone applications:
  Traffic from wearables (periodic positioning information etc)
  sensors (Industrial Wireless Sensor Networks transmitting temperature, pressure readings periodically or in an event triggered manner etc)
  smart meters and smart meter networks sending periodic meter readings
As noted in 3GPP TS 22.891, the NR system shall:
  be efficient and flexible for low throughput short data bursts
  support efficient signalling mechanisms (e.g. signalling is less than payload)
  reduce signalling overhead in general
Signalling overhead from INACTIVE state UEs for small data packets is a general problem and will become a critical issue with more UEs in NR not only for network performance and efficiency but also for the UE battery performance. In general, any device that has intermittent small data packets in INACTIVE state will benefit from enabling small data transmission in INACTIVE.
The key enablers for small data transmission in NR, namely the INACTIVE state, 2-step, 4-step RACH and configured grant type-1 have already been specified as part of Rel-15 and Rel-16. So, this work builds on these building blocks to enable small data transmission in INACTIVE state for NR.

4 Objective

4.1 Objective of SI or Core Part WI or Testing Part WI

This work item enables small data transmission in RRC_INACTIVE state as follows:
  For the RRC_INACTIVE state:
  UL small data transmissions for RACH-based schemes (i.e. 2-step and 4-step RACH):
    General procedure to enable UP data transmission for small data packets from INACTIVE state (e.g. using MSGA or MSG3) [RAN2]
    Enable flexible payload sizes larger than the Rel-16 CCCH message size that is possible currently for INACTIVE state for MSGA and MSG3 to support UP data transmission in UL (actual payload size can be up to network configuration) [RAN2]
    Context fetch and data forwarding (with and without anchor relocation) in INACTIVE state for RACH-based solutions [RAN2, RAN3]
    Note 1: The security aspects of the above solutions should be checked with SA3
  Transmission of UL data on pre-configured PUSCH resources (i.e. reusing the configured grant type 1)—when TA is valid
    General procedure for small data transmission over configured grant type 1 resources from INACTIVE state [RAN2]
    Configuration of the configured grant type1 resources for small data transmission in UL for INACTIVE state [RAN2]
No new RRC state should be introduced in this WID. Transmission of smalldata in UL, subsequent transmission of smalldata in UL and DL and the state transition decisions should be under network control.
Focus of the WID should be on licensed carriers and the solutions can be reused for NR-U if applicable.
Note 2: Any associated specification work in RAN1 that is needed to support the above set of objectives should be initiated by RAN2 via an LS.
[From 3GPP RAN2 #111 Meeting Minutes:]

8.6.2 UL Small Data Transmissions for RACH-Based Schemes

| | Agreements |
|---|---|
| 1 | Small data transmission with RRC message is supported as baseline for RA-based and CG based schemes |
| 2 | RRC-less can be studied for limited use cases (e.g. same serving cell and/or for CG) with lower priority |
| 3 | Context fetch and data forwarding with anchor re-location and without anchor re-location will be considered. FFS if there are problems with the scenario "without anchor relocation". |
| 4 | From RAN2 perspective, stored "configuration" in the UE Context is used for the RLC bearer configuration for any SDT mechanism (RACH and CG). |
| 5 | The 2-step RACH or 4-step RACH should be applied to RACH based uplink small data transmission in RRC_INACTIVE |
| 6 | The uplink small data can be sent in MSGA of 2-step RACH or msg3 of 4-step RACH. |
| 7 | Small data transmission is configured by the network on a per DRB basis |

-continued

| | Agreements |
|---|---|
| 8 | Data volume threshold is used for the UE to decide whether to do SDT or not.<br>FFS how we calculate data volume.<br>FFS if an "additional SDT specific" RSRP threshold is further used to determine whether the UE should do SDT |
| 9 | UL/DL transmission following UL SDT without transitioning to RRC_CONNECTED is supported |
| 10 | When UE is in RRC_INACTIVE, it should be possible to send multiple UL and DL packets as part of the same SDT mechanism and without transitioning to RRC_CONNECTED on dedicated grant. FFS on details and whether any indication to network is needed. |

The NR Radio Resource Control (RRC) specification (3GPP TS 38.331) provides the following description related to RRC resume procedure:

4.2.2 Signalling Radio Bearers

"Signalling Radio Bearers" (SRBs) are defined as Radio Bearers (RBs) that are used only for the transmission of RRC and NAS messages. More specifically, the following SRBs are defined:

SRB0 is for RRC messages using the CCCH logical channel;

SRB1 is for RRC messages (which may include a piggybacked NAS message) as well as for NAS messages prior to the establishment of SRB2, all using DCCH logical channel;

SRB2 is for NAS messages and for RRC messages which include logged measurement information, all using DCCH logical channel. SRB2 has a lower priority than SRB1 and may be configured by the network after AS security activation;

SRB3 is for specific RRC messages when UE is in (NG)EN-DC or NR-DC, all using DCCH logical channel.

5.3.13 RRC Connection Resume 5.3.13.1 General

Figure 5:
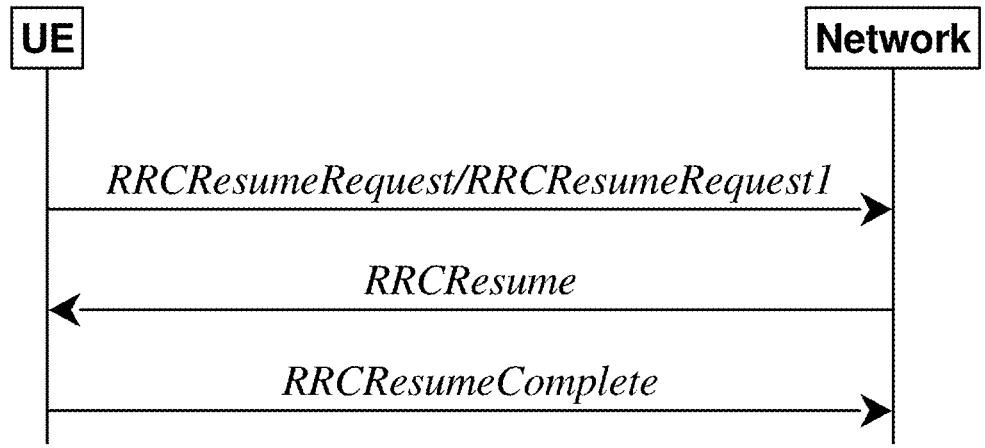
FIG. 5 is a reproduction of FIG. 5.3.13.1-1 of 3GPP TS 38.331 V16.1.0.
Figure 6:
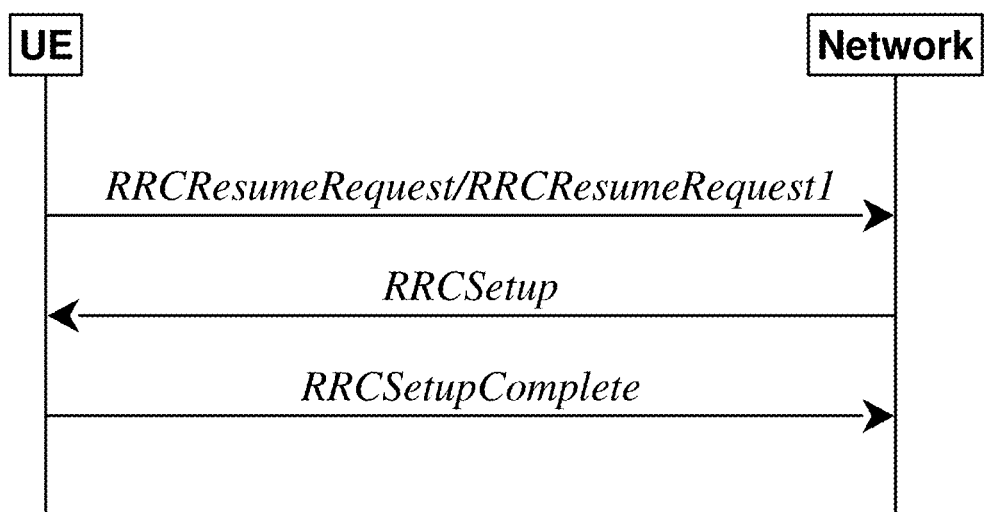
FIG. 6 is a reproduction of FIG. 5.3.13.1-2 of 3GPP TS 38.331 V16.1.0.
Figure 7:
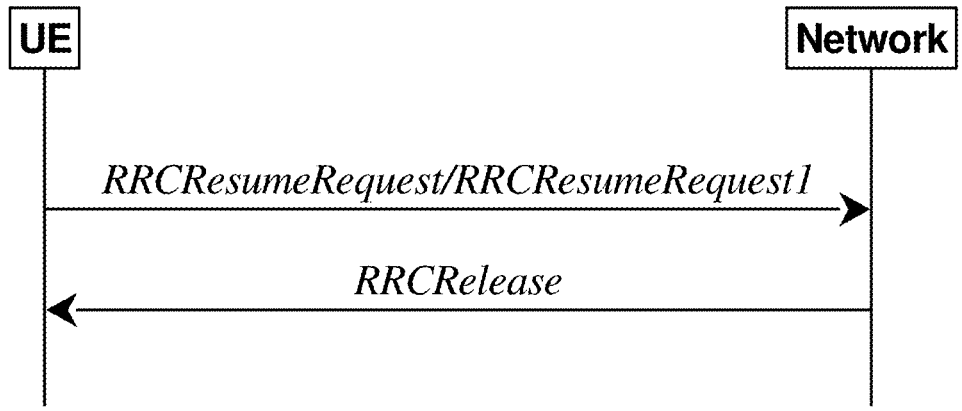
FIG. 7 is a reproduction of FIG. 5.3.13.1-3 of 3GPP TS 38.331 V16.1.0.
Figure 8:
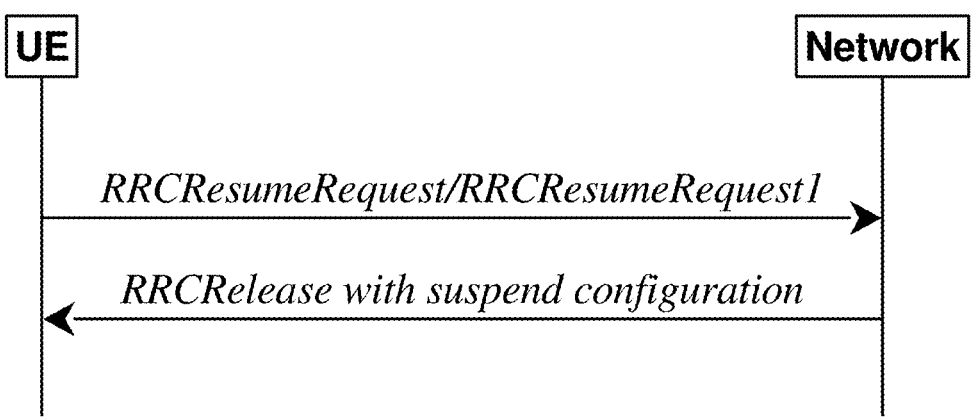
FIG. 8 is a reproduction of FIG. 5.3.13.1-4 of 3GPP TS 38.331 V16.1.0.
Figure 9:
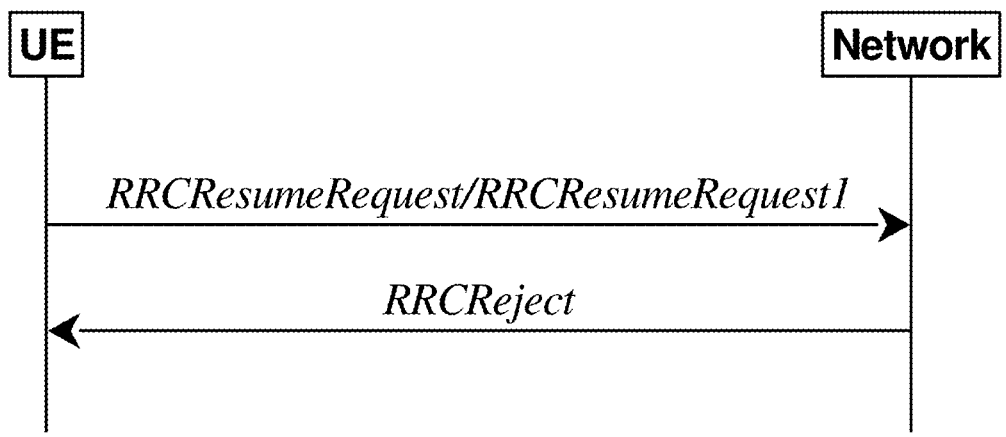
FIG. 9 is a reproduction of FIG. 5.3.13.1-5 of 3GPP TS 38.331 V16.1.0.

[FIG. 5.3.13.1-1 of 3GPP TS 38.331 V16.1.0, entitled "RRC connection resume, successful", is reproduced as FIG. 5]
[FIG. 5.3.13.1-2 of 3GPP TS 38.331 V16.1.0, entitled "RRC connection resume fallback to RRC connection establishment, successful", is reproduced as FIG. 6]
[FIG. 5.3.13.1-3 of 3GPP TS 38.331 V16.1.0, entitled "RRC connection resume followed by network release, successful", is reproduced as FIG. 7]
[FIG. 5.3.13.1-4 of 3GPP TS 38.331 V16.1.0, entitled "RRC connection resume followed by network suspend, successful", is reproduced as FIG. 8]
[FIG. 5.3.13.1-5 of 3GPP TS 38.331 V16.1.0, entitled "RRC connection resume, network reject", is reproduced as FIG. 9]
The purpose of this procedure is to resume a suspended RRC connection, including resuming SRB(s) and DRB(s) or perform an RNA update.

5.3.13.2 Initiation

The UE initiates the procedure when upper layers or AS (when responding to RAN paging, upon triggering RNA updates while the UE is in RRC_INACTIVE, or for sidelink communication as specified in sub-clause 5.3.13.1a) requests the resume of a suspended RRC connection.
The UE shall ensure having valid and up to date essential system information as specified in clause 5.2.2.2 before initiating this procedure.
Upon initiation of the procedure, the UE shall:
1> if the resumption of the RRC connection is triggered by response to NG-RAN paging:
  2> select '0' as the Access Category;
  2> perform the unified access control procedure as specified in 5.3.14 using the selected Access Category and one or more Access Identities provided by upper layers;
    3> if the access attempt is barred, the procedure ends;
1> else if the resumption of the RRC connection is triggered by upper layers:
  2> if the upper layers provide an Access Category and one or more Access Identities:
    3> perform the unified access control procedure as specified in 5.3.14 using the Access Category and Access Identities provided by upper layers;
      4> if the access attempt is barred, the procedure ends;
  2> set the resumeCause in accordance with the information received from upper layers;
1> else if the resumption of the RRC connection is triggered due to an RNA update as specified in 5.3.13.8:
  2> if an emergency service is ongoing:
  NOTE: How the RRC layer in the UE is aware of an ongoing emergency service is up to UE implementation.
    3> select '2' as the Access Category;
    3> set the resumeCause to emergency;
  2> else:
    3> select '8' as the Access Category;
  2> perform the unified access control procedure as specified in 5.3.14 using the selected Access Category and one or more Access Identities to be applied as specified in TS 24.501 [23];
    3> if the access attempt is barred:
      4> set the variable pendingRNA-Update to true;
      4> the procedure ends;
1> if the UE is in NE-DC or NR-DC:
  2> if the UE does not support maintaining SCG configuration upon connection resumption:
    3> release the MR-DC related configurations (i.e., as specified in 5.3.5.10) from the UE Inactive AS context, if stored;
1> if the UE does not support maintaining the MCG SCell configurations upon connection resumption:
  2> release the MCG SCell(s) from the UE Inactive AS context, if stored;
1> apply the default L1 parameter values as specified in corresponding physical layer specifications, except for the parameters for which values are provided in SIB1;
1> apply the default SRB1 configuration as specified in 9.2.1;
1> apply the default MAC Cell Group configuration as specified in 9.2.2;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> release idc-AssistanceConfig from the UE Inactive AS context, if stored;

1> release drx-PreferenceConfig for all configured cell groups from the UE Inactive AS context, if stored;
1> stop all instances of timer T346a, if running;
1> release maxBW-PreferenceConfig for all configured cell groups from the UE Inactive AS context, if stored;
1> stop all instances of timer T346b, if running;
1> release maxCC-PreferenceConfig for all configured cell groups from the UE Inactive AS context, if stored;
1> stop all instances of timer T346c, if running;
1> release maxMIMO-LayerPreferenceConfig for all configured cell groups from the UE Inactive AS context, if stored;
1> stop all instances of timer T346d, if running;
1> release minSchedulingOffsetPreferenceConfig for all configured cell groups from the UE Inactive AS context, if stored;
1> stop all instances of timer T346e, if running;
1> release releasePreferenceConfig from the UE Inactive AS context, if stored;
1> stop timer T346f, if running;
1> apply the CCCH configuration as specified in 9.1.1.2;
1> apply the timeAlignmentTimerCommon included in SIB1;
1> start timer T319;
1> set the variable pendingRNA-Update to false;
1> initiate transmission of the RRCResumeRequest message or RRCResumeRequest1 in accordance with 5.3.13.3.

5.3.13.3 Actions Related to Transmission of RRCResumeRequest or RRCResumeRequest1 Message The UE shall set the contents of RRCResumeRequest or RRCResumeRequest1 message as follows:
1> if field useFullResumeID is signalled in SIB1:
2> select RRCResumeRequest1 as the message to use;
2> set the resumeIdentity to the stored fullI-RNTI value;
1> else:
2> select RRCResumeRequest as the message to use;
2> set the resumeIdentity to the stored shortI-RNTI value;
1> restore the RRC configuration, RoHC state, the stored QoS flow to DRB mapping rules and the $K_{gNB}$ and $K_{RRCint}$ keys from the stored UE Inactive AS context except for the following:
masterCellGroup;
mrdc-SecondaryCellGroup, if stored; and
pdcp-Config;
1> set the resumeMAC-I to the 16 least significant bits of the MAC-I calculated:
2> over the ASN.1 encoded as per clause 8 (i.e., a multiple of 8 bits) VarResumeMAC-Input;
2> with the $K_{RRCint}$ key in the UE Inactive AS Context and the previously configured integrity protection algorithm; and
2> with all input bits for COUNT, BEARER and DIRECTION set to binary ones;
1> derive the $K_{gNB}$ key based on the current $K_{gNB}$ key or the NH, using the stored nextHopChainingCount value, as specified in TS 33.501 [11];
1> derive the $K_{RRCenc}$ key, the $K_{RRCint}$ key, the $K_{UPint}$ key and the $K_{UPenc}$ key;
1> configure lower layers to apply integrity protection for all radio bearers except SRB0 using the configured algorithm and the $K_{RRCint}$ key and $K_{UPint}$ key derived in this subclause immediately, i.e., integrity protection shall be applied to all subsequent messages received and sent by the UE;

NOTE 1: Only DRBs with previously configured UP integrity protection shall resume integrity protection.
1> configure lower layers to apply ciphering for all radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE;
1> re-establish PDCP entities for SRB1;
1> resume SRB1;
1> submit the selected message RRCResumeRequest or RRCResumeRequest1 for transmission to lower layers.
NOTE 2: Only DRBs with previously configured UP ciphering shall resume ciphering.
If lower layers indicate an integrity check failure while T319 is running, perform actions specified in 5.3.13.5.
The UE shall continue cell re-selection related measurements as well as cell re-selection evaluation. If the conditions for cell re-selection are fulfilled, the UE shall perform cell re-selection as specified in 5.3.13.6.

5.3.13.4 Reception of the RRCResume by the UE

The UE shall:
1> stop timer T319;
1> stop timer T380, if running;
1> if T331 is running:
2> stop timer T331;
2> perform the actions as specified in 5.7.8.3;
1> if the RRCResume includes the fullConfig:
2> perform the full configuration procedure as specified in 5.3.5.11;
1> else:
2> if the RRCResume does not include the restoreMCG-SCells:
3> release the MCG SCell(s) from the UE Inactive AS context, if stored;
2> if the RRCResume does not include the restoreSCG:
3> release the MR-DC related configurations (i.e., as specified in 5.3.5.10) from the UE Inactive AS context, if stored;
2> restore the masterCellGroup, mrdc-SecondaryCellGroup, if stored, and pdcp-Config from the UE Inactive AS context;
2> configure lower layers to consider the restored MCG and SCG SCell(s) (if any) to be in deactivated state;
1> discard the UE Inactive AS context;
1>release the suspendConfig except the ran-NotificationAreaInfo;
1> if the RRCResume includes the masterCellGroup:
2> perform the cell group configuration for the received masterCellGroup according to 5.3.5.5;
1> if the RRCResume includes the mrdc-SecondaryCellGroup:
2> if the received mrdc-SecondaryCellGroup is set to nr-SCG:
3> perform the RRC reconfiguration according to 5.3.5.3 for the RRCReconfiguration message included in nr-SCG;
2> if the received mrdc-SecondaryCellGroup is set to eutra-SCG:
3> perform the RRC connection reconfiguration as specified in TS 36.331 [10], clause 5.3.5.3 for the RRCConnectionReconfiguration message included in eutra-SCG;

1> if the RRCResume includes the radioBearerConfig:
2> perform the radio bearer configuration according to 5.3.5.6;
1> if the RRCResume message includes the sk-Counter:
2> perform security key update procedure as specified in 5.3.5.7;
1> if the RRCResume message includes the radioBearerConfig2:
2> perform the radio bearer configuration according to 5.3.5.6;
1> if the RRCResume message includes the needForGapsConfigNR:
2> if needForGapsConfigNR is set to setup:
3> consider itself to be configured to provide the measurement gap requirement information of NR target bands;
2> else:
3> consider itself not to be configured to provide the measurement gap requirement information of NR target bands;
1> resume SRB2, SRB3 (if configured), and all DRBs;
1> if stored, discard the cell reselection priority information provided by the cellReselectionPriorities or inherited from another RAT;
1> stop timer T320, if running;
1> if the RRCResume message includes the measConfig:
2> perform the measurement configuration procedure as specified in 5.5.2;
1> resume measurements if suspended;
1> if T390 is running:
2> stop timer T390 for all access categories;
2> perform the actions as specified in 5.3.14.4;
1> if T302 is running:
2> stop timer T302;
2> perform the actions as specified in 5.3.14.4;
1> enter RRC CONNECTED;
1> indicate to upper layers that the suspended RRC connection has been resumed;
1> stop the cell re-selection procedure;
1> consider the current cell to be the PCell;
1> set the content of the of RRCResumeComplete message as follows:
2> if the upper layer provides NAS PDU, set the dedicatedNAS-Message to include the information received from upper layers;
2> if the upper layer provides a PLMN, set the selectedPLMN-Identity to PLMN selected by upper layers (TS 24.501 [23]) from the PLMN(s) included in the plmn-IdentityList or in the npn-IdentityInfoList in SIB1;
2> if the masterCellGroup contains the reportUplinkTxDirectCurrent:
3> include the uplinkTxDirectCurrentList for each MCG serving cell with UL;
3> include uplinkDirectCurrentBWP-SUL for each MCG serving cell configured with SUL carrier, if any, within the uplinkTxDirectCurrentList;
2> if the UE has idle/inactive measurement information concerning cells other than the PCell available in VarMeasIdleReport:
3> if the idleModeMeasurementReq is included in the RRCResume message:
4> set the measResultIdleEUTRA in the RRCResumeComplete message to the value of measReportIdleEUTRA in the VarMeasIdleReport, if available;
4> set the measResultIdleNR in the RRCResumeComplete message to the value of measReportIdleNR in the VarMeasIdleReport, if available;
4> discard the VaorMeasIdleReport upon successful delivery of the RRCResumeComplete message is confirmed by lower layers;
3> else:
4> if the S1B1 contains idleModeMeasurementsNR and the UE has NR idle/inactive measurement information concerning cells other than the PCell available in VarMeasIdleReport; or
4> if the S1B1 contains idleModeMeasurementsEUTRA and the UE has E-UTRA idle/inactive measurement information available in VarMeasIdleReport:
5> include the idleMeasAvailable;
2> if the RRCResume message includes the mrdc-SecondaryCellGroupConfig with mrdc-SecondaryCellGroup set to eutra-SCG:
3> include in the eutra-SCG-Response the E-UTRA RRCConnectionReconfigurationComplete message in accordance with TS 36.331 [10] clause 5.3.5.3;
2> if the RRCResume message includes the mrdc-SecondaryCellGroupConfig with mrdc-SecondaryCellGroup set to nr-SCG:
3> include in the nr-SCG-Response the SCG RRCReconfigurationComplete message;
2> if the UE has logged measurements available for NR and if the RPLMN is included in plmn-IdentityList stored in VarLogMeasReport:
3> include the logMeasAvailable in the RRCResumeComplete message;
2> if the UE has Bluetooth logged measurements available and if the RPLMN is included in plmn-IdentityList stored in VarLogMeasReport:
3> include the logMeasAvailableBT in the RRCResumeComplete message;
2> if the UE has WLAN logged measurements available and if the RPLMN is included in plmn-IdentityList stored in VarLogMeasReport:
3> include the logMeasAvailableWLAN in the RRCResumeComplete message;
2> if the UE has connection establishment failure or connection resume failure information available in VarConnEstFailReport and if the RPLMN is equal to plmn-Identity stored in VarConnEstFailReport:
3> include connEstFailInfoAvailable in the RRCResumeComplete message;
2> if the UE has radio link failure or handover failure information available in VarRLF-Report and if the RPLMN is included in plmn-IdentityList stored in VarRLF-Report; or
2> if the UE has radio link failure or handover failure information available in VarRLF-Report of TS 36.331 [10] and if the UE is capable of cross-RAT RLF reporting and if the RPLMN is included in plmn-IdentityList stored in VarRLF-Report of TS 36.331 [10]:
3> include rlf-InfoAvailable in the RRCResumeComplete message;
2> if the UE supports storage of mobility history information and the UE has mobility history information available in VarMobilityHistoryReport:
3> include the mobilityHistoryAvail in the RRCResumeComplete message;

2> if speedStateReselectionPars is configured in the SIB2:

3> include the mobilityState in the RRCResumeComplete message and set it to the mobility state (as specified in TS 38.304 [20]) of the UE just prior to entering RRC_CONNECTED state;

2> if the UE is configured to provide the measurement gap requirement information of NR target bands:

3> include the NeedForGapsInfoNR and set the contents as follows:

4> include intraFreq-needForGap and set the gap requirement informantion of intra-frequency measurement for each NR serving cell;

4> if requestedTargetBandFilterNR is configured, for each supported NR band that is also included in requestedTargetBandFilterNR, include an entry in interFreq-needForGap and set the gap requirement information for that band; otherwise, include an entry in interFreq-needForGap and set the corresponding gap requirement information for each supported NR band;

1> submit the RRCResumeComplete message to lower layers for transmission;

1> the procedure ends.

NR Medium Access Control (MAC) specification (3GPP TS 38.321) provides the following description related to MAC reset in NR:

5.12 MAC Reset

If a reset of the MAC entity is requested by upper layers, the MAC entity shall:

1> initialize Bj for each logical channel to zero;

1> stop (if running) all timers;

1> consider all timeAlignmentTimers as expired and perform the corresponding actions in clause 5.2;

1> set the NDIs for all uplink HARQ processes to the value 0;

1> sets the NDIs for all HARQ process IDs to the value 0 for monitoring PDCCH in Sidelink resource allocation mode 1;

1> stop, if any, ongoing RACH procedure;

1> discard explicitly signalled contention-free Random Access Resources for 4-step RA type and 2-step RA type, if any;

1> flush Msg3 buffer;

1> flush MSGA buffer;

1> cancel, if any, triggered Scheduling Request procedure;

1> cancel, if any, triggered Buffer Status Reporting procedure;

1> cancel, if any, triggered Power Headroom Reporting procedure;

1> cancel, if any, triggered consistent LBT failure;

1> cancel, if any, triggered Sidelink Buffer Status Reporting procedure;

1> flush the soft buffers for all DL HARQ processes;

1> for each DL HARQ process, consider the next received transmission for a TB as the very first transmission;

1> release, if any, Temporary C-RNTI;

1> reset all BFI_COUNTERs;

1> reset LBT_COUNTER.

NR MAC specification (3GPP TS 38.321) and RRC specification (3GPP TS 38.331) provides the following description related to beam failure recovery (BFR) and radio link failure (RLF) in NR:

[From 3GPP TS 38.321:]

5.17 Beam Failure Detection and Recovery Procedure

The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing Random Access procedure for beam failure recovery for SpCell, the MAC entity shall stop the ongoing Random Access procedure and initiate a Random Access procedure using the new configuration.

RRC configures the following parameters in the BeamFailureRecoveryConfig and the RadioLinkMonitoringConfig for the Beam Failure Detection and Recovery procedure:

beamFailureInstanceMaxCount for the beam failure detection;

beamFailureDetectionTimer for the beam failure detection;

beamFailureRecoveryTimer for the beam failure recovery procedure;

rsrp-ThresholdSSB: an RSRP threshold for the beam failure recovery;

powerRampingStep: powerRampingStep for the SpCell beam failure recovery;

powerRampingStepHighPriority: powerRampingStepHighPriority for the SpCell beam failure recovery;

preambleReceivedTargetPower: preambleReceivedTargetPower for the SpCell beam failure recovery;

preambleTransMax: preambleTransMax for the SpCell beam failure recovery;

scalingFactorBI: scalingFactorBI for the SpCell beam failure recovery;

ssb-perRACH-Occasion: ssb-perRACH-Occasion for the SpCell beam failure recovery;

ra-ResponseWindow: the time window to monitor response(s) for the SpCell beam failure recovery using contention-free Random Access Preamble;

prach-ConfigurationIndex: prach-ConfigurationIndex for the SpCell beam failure recovery;

ra-ssb-OccasionMaskIndex: ra-ssb-OccasionMaskIndex for the SpCell beam failure recovery;

ra-OccasionList: ra-OccasionList for the SpCell beam failure recovery.

The following UE variables are used for the beam failure detection procedure:

BFI_COUNTER (per Serving Cell): counter for beam failure instance indication which is initially set to 0.

The MAC entity shall for each Serving Cell configured for beam failure detection:

1> if beam failure instance indication has been received from lower layers:

2> start or restart the beamFailureDetectionTimer;

2> increment BFI_COUNTER by 1;

2> if BFI_COUNTER>=beamFailureInstanceMaxCount:
   3> if the Serving Cell is SCell:
      4> trigger a BFR for this Serving Cell;
   3> else:
      4> initiate a Random Access procedure (see clause 5.1) on the SpCell.
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
   2> set BFI COUNTER to 0.
1> if the Serving Cell is SpCell and the Random Access procedure initiated for SpCell beam failure recovery is successfully completed (see clause 5.1):
   2> set BFI_COUNTER to 0;
   2> stop the beamFailureRecoveryTimer, if configured;
   2> consider the Beam Failure Recovery procedure successfully completed.
1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or
1> if the SCell is deactivated as specified in clause 5.9:
   2> set BFI_COUNTER to 0;
   2> consider the Beam Failure Recovery procedure successfully completed and cancel all the triggered BFRs for this Serving Cell.

The MAC entity shall:
1> if the Beam Failure Recovery procedure determines that at least one BFR has been triggered and not cancelled:
   2> if UL-SCH resources are available for a new transmission and if the UL-SCH resources can accommodate the BFR MAC CE plus its subheader as a result of LCP:
      3> instruct the Multiplexing and Assembly procedure to generate the BFR MAC CE.
   2> else if UL-SCH resources are available for a new transmission and if the UL-SCH resources can accommodate the Truncated BFR MAC CE plus its subheader as a result of LCP:
      3> instruct the Multiplexing and Assembly procedure to generate the Truncated BFR MAC CE.
   2> else:
      3> trigger the SR for SCell beam failure recovery for each SCell for which BFR has been triggered and not cancelled.

All BFRs triggered prior to MAC PDU assembly for beam failure recovery for an SCell shall be cancelled when a MAC PDU is transmitted and this PDU includes a BFR MAC CE or Truncated BFR MAC CE which contains beam failure information of that SCell.
[From 3GPP TS 38.331:]

5.3.10 Radio Link Failure Related Actions

5.3.10.1 Detection of Physical Layer Problems in RRC_CONNECTED

The UE shall:
1> if any DAPS bearer is configured, upon receiving N310 consecutive "out-of-sync" indications for the source SpCell from lower layers while T304 is running:
   2> start timer T310 for the sourceSpCell.
1> upon receiving N310 consecutive "out-of-sync" indications for the SpCell from lower layers while neither T300, T301, T304, T311, T316 nor T319 are running:
   2> start timer T310 for the corresponding SpCell.

5.3.10.2 Recovery of Physical Layer Problems

Upon receiving N311 consecutive "in-sync" indications for the SpCell from lower layers while T310 is running, the UE shall:
1> stop timer T310 for the corresponding SpCell.
1> stop timer T312 for the corresponding SpCell, if running.

NOTE 1: In this case, the UE maintains the RRC connection without explicit signalling, i.e. the UE maintains the entire radio resource configuration.

NOTE 2: Periods in time where neither "in-sync" nor "out-of-sync" is reported by L1 do not affect the evaluation of the number of consecutive "in-sync" or "out-of-sync" indications.

5.3.10.3 Detection of Radio Link Failure

The UE shall:
1> if any DAPS bearer is configured:
   2> upon T310 expiry in source SpCell; or
   2> upon random access problem indication from source MCG MAC; or
   2> upon indication from source MCG RLC that the maximum number of retransmissions has been reached; or
   2> upon consistent uplink LBT failure indication from source MCG MAC:
      3> consider radio link failure to be detected for the source MCG i.e. source RLF;
      3> suspend the transmission of all DRBs in the source MCG;
      3> reset MAC for the source MCG;
      3> release the source connection.
1> else:
   2> upon T310 expiry in PCell; or
   2> upon T312 expiry in PCell; or
   2> upon random access problem indication from MCG MAC while neither T300, T301, T304, T311 nor T319 are running; or
   2> upon indication from MCG RLC that the maximum number of retransmissions has been reached; or
   2> if connected as an IAB-node, upon BH RLF indication received on BAP entity from the MCG; or
   2> upon consistent uplink LBT failure indication from MCG MAC while T304 is not running:
      3> if the indication is from MCG RLC and CA duplication is configured and activated, and for the corresponding logical channel allowedServingCells only includes SCell(s):
         4> initiate the failure information procedure as specified in 5.7.5 to report RLC failure.
      3> else:
         4> consider radio link failure to be detected for the MCG i.e. RLF;
[ . . . ]
      4> if AS security has not been activated:
         5> perform the actions upon going to RRC_IDLE as specified in 5.3.11, with release cause 'other';

4> else if AS security has been activated but SRB2 and at least one DRB or, for IAB, SRB2, have not been setup:
  5> store the radio link failure information in the VarRLF-Report as described in subclause 5.3.10.5;
  5> perform the actions upon going to RRC_IDLE as specified in 5.3.11, with release cause 'RRC connection failure';
4> else:
  5> store the radio link failure information in the VarRLF-Report as described in subclause 5.3.10.5;
  5> if T316 is configured; and
  5> if SCG transmission is not suspended; and
  5> if PSCell change is not ongoing (i.e. timer T304 for the NR PSCell is not running in case of NR-DC or timer T307 of the E-UTRA PSCell is not running as specified in TS 36.331 [10], clause 5.3.10.10, in NE-DC):
    6> initiate the MCG failure information procedure as specified in 5.7.3b to report MCG radio link failure.
  5> else:
    6> initiate the connection re-establishment procedure as specified in 5.3.7.

The UE may discard the radio link failure information, i.e. release the UE variable VarRLF-Report, 48 hours after the radio link failure is detected.

The UE shall:
1> upon T310 expiry in PSCell; or
1> upon T312 expiry in PSCell; or
1> upon random access problem indication from SCG MAC; or
1> upon indication from SCG RLC that the maximum number of retransmissions has been reached; or
1> if connected as an IAB-node, upon BH RLF indication received on BAP entity from the SCG; or
1> upon consistent uplink LBT failure indication from SCG MAC:
  2> if the indication is from SCG RLC and CA duplication is configured and activated; and for the corresponding logical channel allowedServingCells only includes SCell(s):
    3> initiate the failure information procedure as specified in 5.7.5 to report RLC failure.
  2> else if MCG transmission is not suspended:
    3> consider radio link failure to be detected for the SCG, i.e. SCG RLF;
    3> initiate the SCG failure information procedure as specified in 5.7.3 to report SCG radio link failure.
  2> else:
    3> if the UE is in NR-DC:
      4> initiate the connection re-establishment procedure as specified in 5.3.7;
    3> else (the UE is in (NG)EN-DC):
      4> initiate the connection re-establishment procedure as specified in TS 36.331 [10], clause 5.3.7;

RRC_INACTIVE state was introduced for UEs with infrequent data transmission. When there is no data transmission, the UE could be put into RRC_INACTIVE state (i.e. the RRC connection is suspended) for reducing power consumption. The current serving gNB will store (or maintain) the UE context (e.g. configurations and identities of the UE) for the UE while the UE is in RRC_INACTIVE state. Upon data arrival, the UE could resume the RRC connection from RRC_INACTIVE state, which is faster than establishing a new RRC connection from RRC_IDLE state. After resuming the RRC connection (e.g. after successful completion of a RA procedure), the UE is able to transmit data (e.g. data from application layer) in RRC_CONNECTED state as usual. In addition, the UE is able to resume the RRC connection on a different gNB (i.e. new gNB) than the original gNB (i.e. old gNB) in which the RRC connection was suspended. In this case, the new gNB tries to retrieve the UE context from the old gNB.

If the new gNB fails to retrieve the UE context, fallback to RRC connection setup procedure may take place (i.e. establishing a new RRC connection). When RRC connection of a UE is suspended, the UE will store (part of) its current RRC configuration in the "UE Inactive AS context". After a UE initiates the RRC Resume procedure on a Cell (which will be considered as the SpCell after the RRC connection is successfully resumed in this Cell) and before the UE transmits the RRCResumeRequest message, the UE will restore part of the stored RRC configuration from the UE Inactive AS context, as specified in Section 5.3.13.3 of NR RRC specification (3GPP TS 38.331). More details for RRC_INACTIVE state could be found in NR RRC specification (3GPP TS 38.331).

Although RRC_INACTIVE state brings benefit as stated above, currently the UE is not able to transmit (user-plane) data in RRC_INACTIVE state. That is, the UE needs to enter RRC_CONNECTED state before transmitting the data. After transmitting the data, the UE is put into RRC_INACTIVE state again. The above steps happen for each data transmission regardless of the amount of data and how frequent the data arrives, which may result in power consumption and signaling overhead.

To mitigate the problem, small data transmission in RRC_INACTIVE state is to be introduced (as discussed in 3GPP RP-193252). The main objective of small data transmission is to enable the UE to transmit data in RRC_INACTIVE state without (or before) entering RRC_CONNECTED state. Possible solutions may be based on 2-step Random Access Channel) RACH, 4-step RACH, and/or pre-configured PUSCH resources (e.g. similar to Type-1 configured grant in NR). Small data transmission in RRC_INACTIVE state may be referred to as "SDT in RRC_INACTIVE state" and/or "SDT procedure" and/or "SDT".

For example, when a UE performs 2-step RACH based SDT procedure in a Cell, the UE could include Uplink (UL) data together with a RRCResumeRequest message in the MsgA. When a UE performs 4-step RACH based SDT procedure in a Cell, the UE could include UL data together with a RRCResumeRequest message in the Msg3. When a UE performs pre-configured PUSCH resources based SDT procedure in a Cell, the UE could include UL data together with a RRCResumeRequest message in the PDU to be transmitted using the pre-configured PUSCH resources. The SDT procedure could be a RRC resume procedure. The SDT procedure could comprise a RRC resume procedure. It is possible that a new RRC message is introduced for the SDT procedure (replacing the RRCResumeRequest message as mentioned above). It may be possible that the UL data is transmitted without a RRC message.

Figure 10:
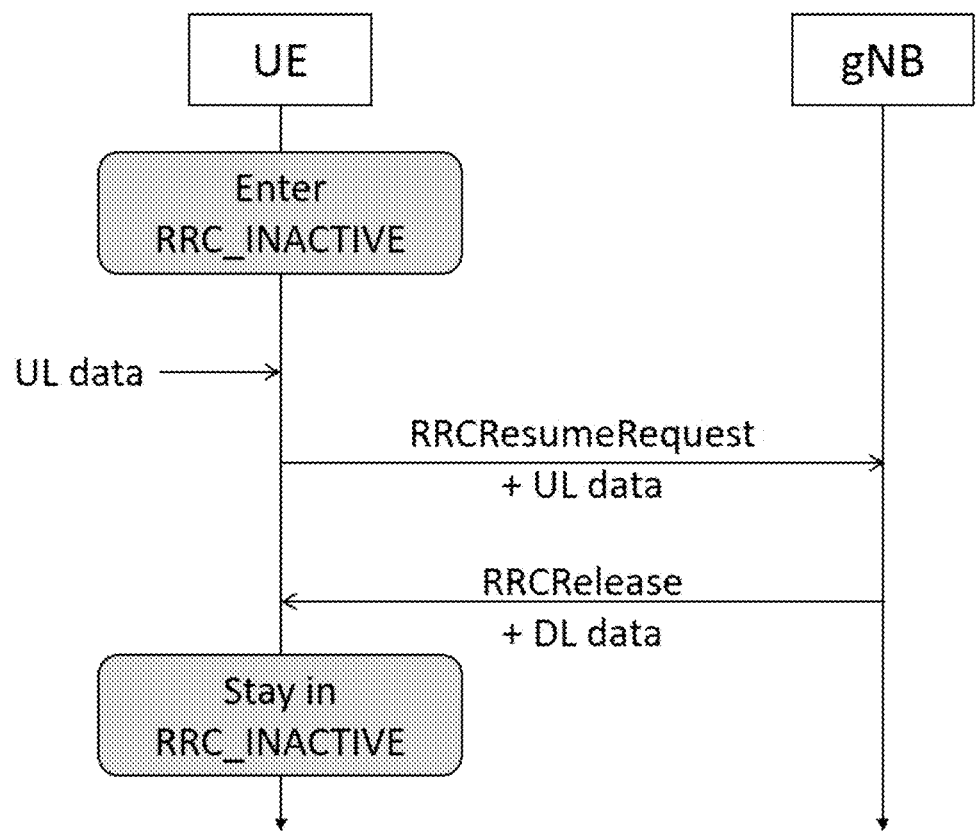
FIG. 10 illustrates a first example of small data transmission (SDT) in RRC_INACTIVE state according to one exemplary embodiment.
Figure 11:
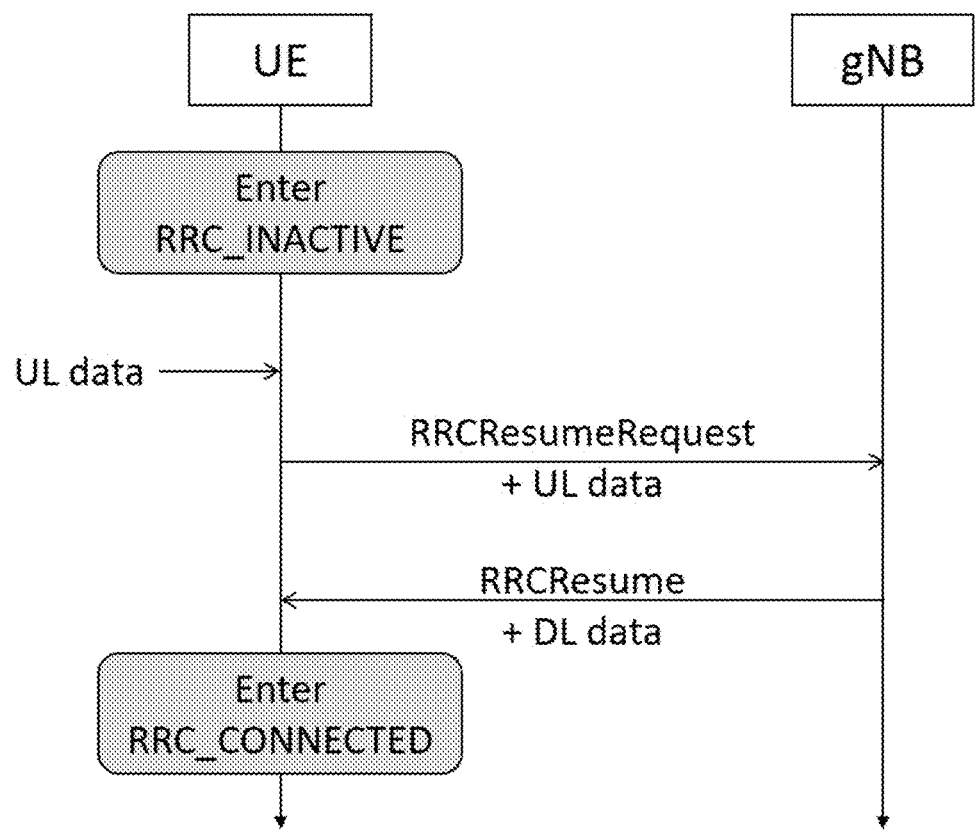
FIG. 11 illustrates a second example of small data transmission (SDT) in RRC_INACTIVE state according to one exemplary embodiment.
Figure 12:
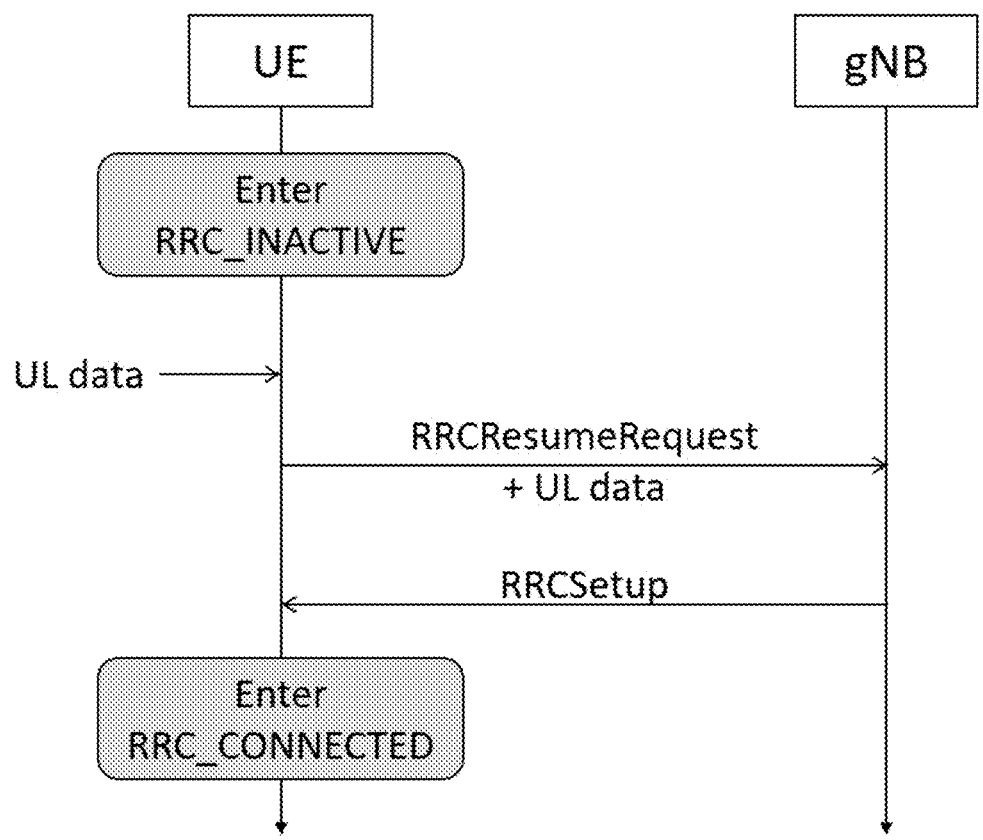
FIG. 12 illustrates a third example of small data transmission (SDT) in RRC_INACTIVE state according to one exemplary embodiment.

FIG. 10 illustrates a first example of small data transmission (SDT) in RRC_INACTIVE state. In this example, the UE stays in RRC_INACTIVE state after performing SDT (e.g. in case no more data are expected to be transmitted). FIG. 11 illustrates a second example of small data transmission (SDT) in RRC_INACTIVE state. In this example, the SDT procedure fallbacks to RRCResume (e.g. in case more data are expected to be transmitted). FIG. 12 illustrates a third example of small data transmission (SDT) in RRC_I-NACTIVE state. In this example, the SDT procedure fallbacks to RRCSetup (e.g. in case the gNB fails to retrieve the UE context of the UE performing SDT).

Typically, the data transmission of a SDT procedure comprises a first UL transmission (e.g. the Msg3 of a 4-step RACH or the MsgA of a 2-step RACH) followed by a first DL transmission (e.g. the Msg4 of a 4-step RACH or the MsgB of a 2-step RACH). If there is additional data which could not be transmitted or received within the first UL or Downlink (DL) transmission, the network may transit the UE into RRC_CONNECTED state for transmitting or receiving the additional data. It is possible that subsequent transmission(s) could take place while the UE is still in RRC_INACTIVE state.

For example, a second UL transmission could follow the first DL transmission and the UE could stay in RRC_INACTIVE after performing the second UL transmission (and receiving "ACK" response from the network). For example, a second DL transmission could follow the second UL transmission and the UE could stay in RRC_INACTIVE after performing the second DL transmission (and transmitting "ACK" to the network). "The completion of a SDT procedure" could refer to the last transmission (e.g. the second UL transmission or the second DL transmission as described above) of the subsequent transmission(s). The RRCRelease message could be included in the first DL transmission rather than the second DL transmission in case the second DL transmission is the last DL transmission in a SDT procedure.

Alternatively, the RRCRelease message could be included in the second DL transmission rather than the first DL transmission in case the second DL transmission is the last DL transmission in a SDT procedure. The subsequent transmission(s) could be considered as part of the SDT procedure. The network could indicate, in the first DL transmission, whether there is subsequent transmission(s) in a SDT procedure. The network could indicate, in the first DL transmission, whether the UE is allowed to perform subsequent transmission(s) in a SDT procedure. The subsequent transmission(s) in a SDT procedure may comprise at least one UL transmission. The subsequent transmission(s) in a SDT procedure may comprise at least one DL transmissions. In case there is subsequent transmission(s), the second UL transmission in a SDT procedure may also be referred to as the first subsequent UL transmission (and so on). In case there is subsequent transmission(s), the second DL transmission in a SDT procedure may also be referred to as the first subsequent DL transmission (and so on). A SDT procedure referred in the following paragraph could comprise a RA procedure for SDT and the subsequent transmissions. The subsequent transmissions could be scheduled by the network with dynamic uplink grant or downlink assignment. The subsequent transmissions could be scheduled by the network without dynamic uplink grant (e.g. the subsequent transmissions via configured grant).

Figure 13:
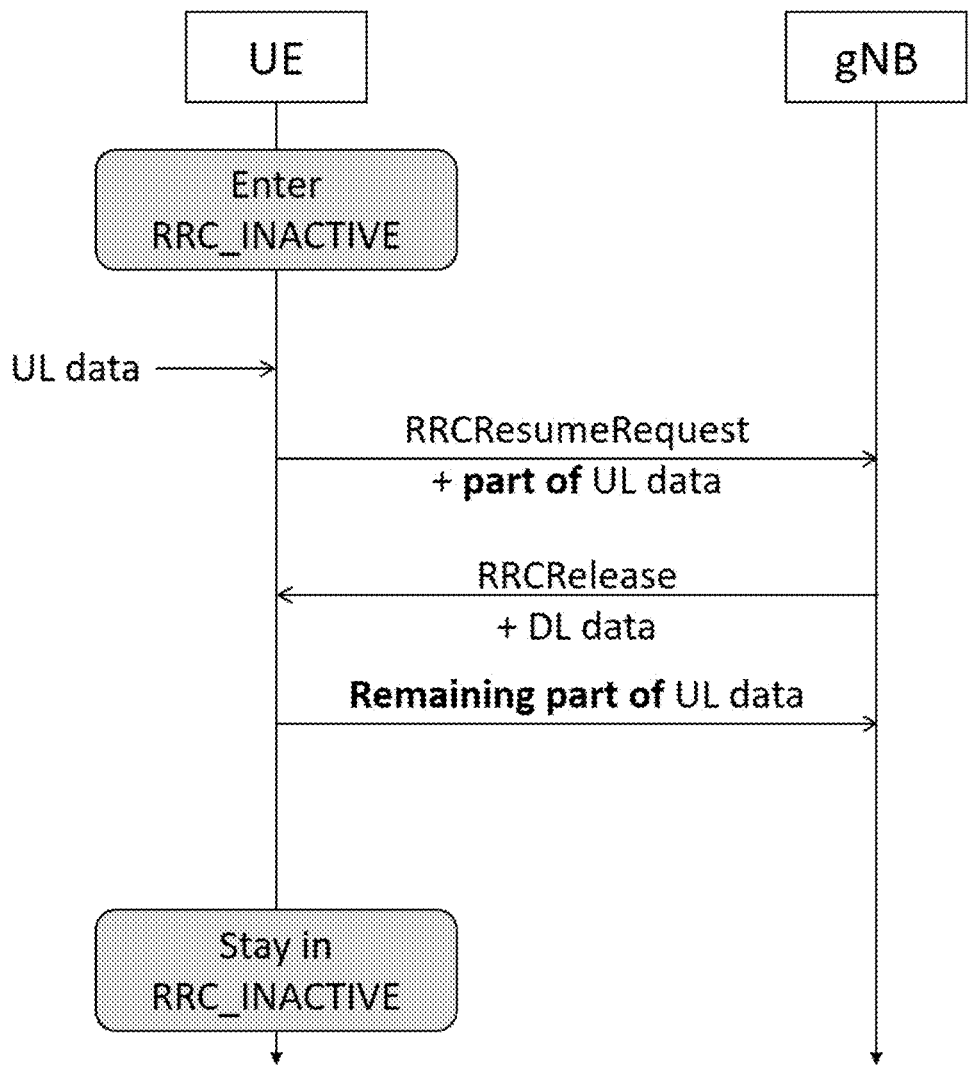
FIG. 13 illustrates a first example that there is one subsequent UL transmission in a SDT procedure according to one exemplary embodiment.
Figure 14:
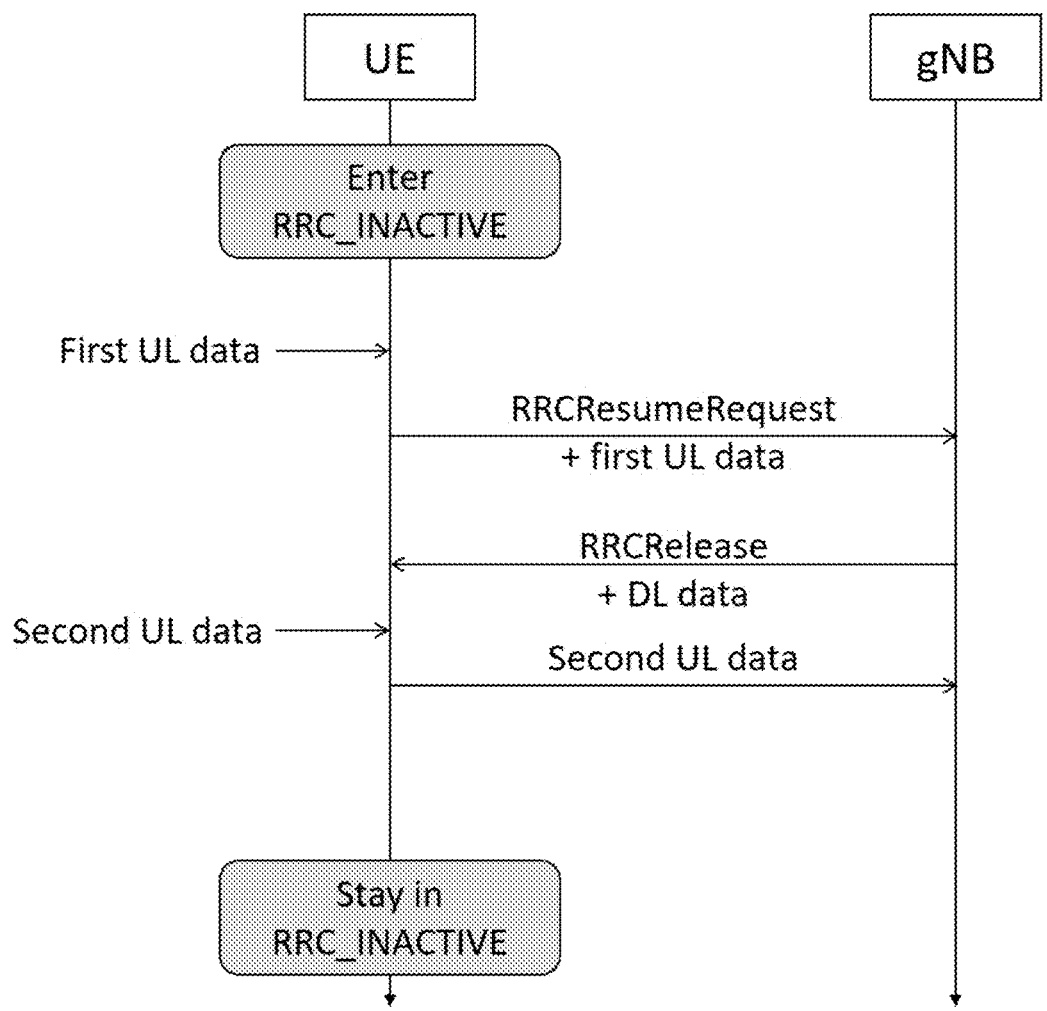
FIG. 14 illustrates a second example that there is one subsequent UL transmission in a SDT procedure according to one exemplary embodiment.

FIG. 13 illustrates a first example that there is one subsequent UL transmission in a SDT procedure. The subsequent UL transmission is used to transmit the remaining UL data (e.g. the remaining part of the UL data in FIG. 13) which could not be transmitted within the first UL transmission (e.g. the part of the UL data in FIG. 13). FIG. 14 illustrates a second example that there is one subsequent UL transmission in a SDT procedure. The subsequent UL transmission is used to transmit the UL data (e.g. the second UL data in FIG. 14) which arrives after the UE receives the DL data from the network.

Figure 15:
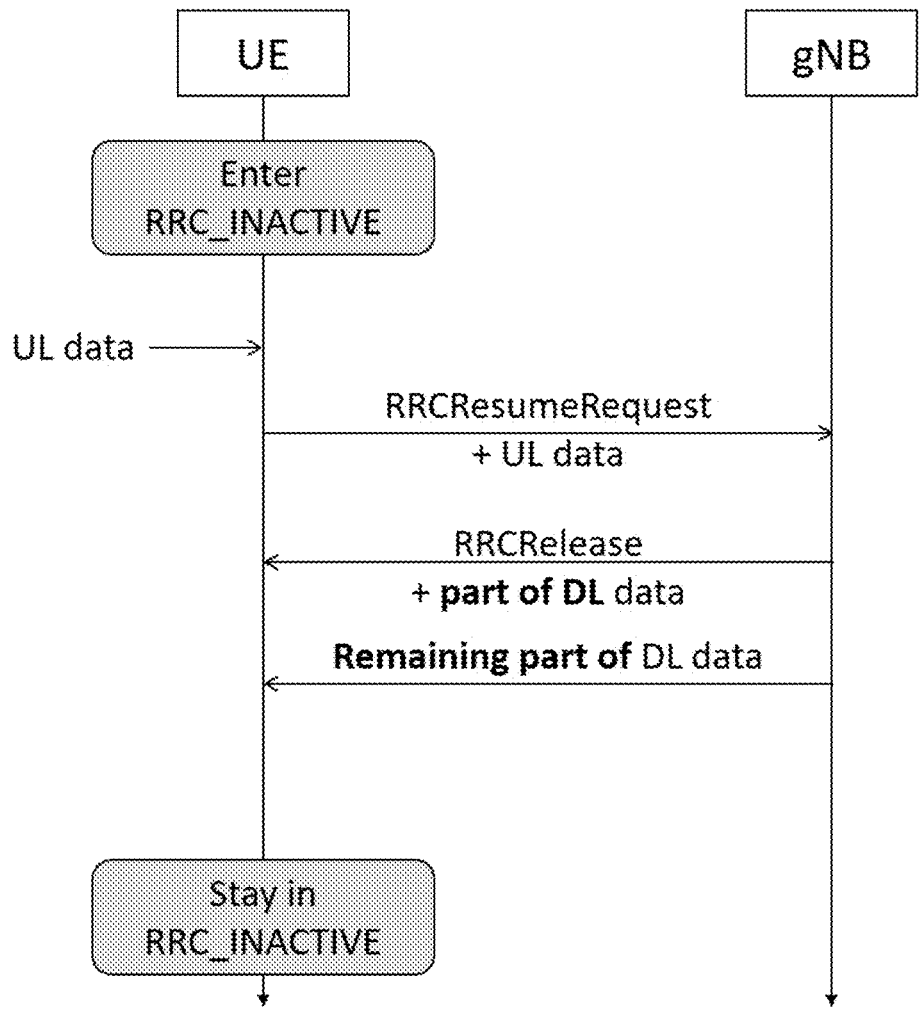
FIG. 15 illustrates a first example that there is one subsequent DL transmission in a SDT procedure according to one exemplary embodiment.
Figure 16:
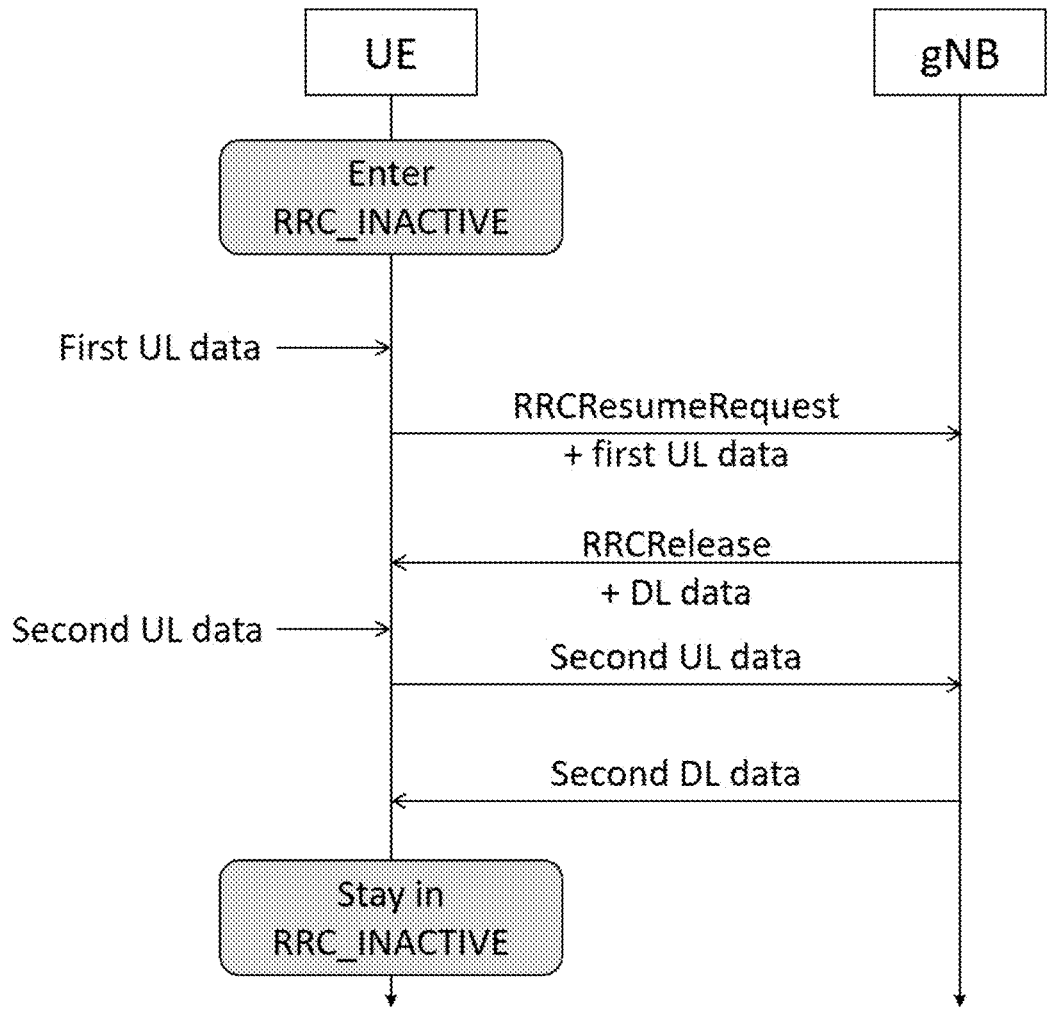
FIG. 16 illustrates a second example that there is one subsequent DL transmission in a SDT procedure according to one exemplary embodiment.

FIG. 15 illustrates a first example that there is one subsequent DL transmission in a SDT procedure. The subsequent DL transmission is used to transmit the remaining DL data (e.g. the remaining part of the DL data in FIG. 15) which could not be transmitted within the first DL transmission (e.g. the part of the DL data in FIG. 15). FIG. 16 illustrates a second example that there is one subsequent DL transmission in a SDT procedure. The subsequent DL transmission is used to transmit the DL data (e.g. the second DL data in FIG. 16) which arrives after the network receives the second UL data from the UE.

During a SDT procedure in RRC_INACTIVE, if a UE has been performing subsequent transmission(s), it is possible that some event occurs (e.g. new data arrival) which may interrupt the ongoing subsequent transmission(s) and/or may result in that the UE is no longer suitable to keep performing subsequent transmission(s). How the UE handles the event(s) needs to be considered.

To solve the issue, the UE could perform one or more of the following actions in response to the occurrence of one or more of the following events described and discussed below.

In one example, if a UE detects new data arrival during a SDT procedure (or subsequent data transmission in the SDT procedure), and the data cannot be transmitted via a SDT procedure (e.g. the data belongs to a Logical Channel (LCH) or Data Radio Bearer (DRB) that is not configured to use SDT), the UE may stop the SDT procedure. The UE may fallback to (or initiate) a RRC resume procedure (e.g. without small data transmission). The data may be with higher priority than the current data (in the buffer) to be transmitted during the SDT procedure.

If new data is arrived during the SDT procedure, and the data is not with higher priority than the current data (in the buffer) to be transmitted during the SDT procedure, the UE may continue the SDT procedure.

If new data is arrived during the SDT procedure, and the data can be transmitted via the SDT procedure (e.g. the data belongs to a LCH or DRB that is configured to use SDT), the UE may continue the SDT procedure. A buffer statue report (BSR) may be triggered. The UE may transmit the BSR during the SDT procedure.

The UE may receive a configuration of DRB (or LCH) indicating whether a DRB (or LCH) is configured to use SDT (or whether the data belonging to the DRB (or LCH) that can be transmitted via SDT). The data that can be transmitted via SDT could be referred to "SDT data." For example, the SDT data could belong to a DRB (or LCH) configured to use SDT. The data that cannot be transmitted via SDT could be referred to "non-SDT data." For example, the non-SDT data could belong to a DRB (or LCH) not configured to use SDT.

The events mentioned above may include at least one of the following events or sub-events:

New data arrival

The UE may consider new data is arrived if data becomes available for transmission. The UE may consider new data is arrived if a BSR is triggered (e.g. a Regular BSR).

The new data may be UL data to be transmitted to NW. The new data may belong to a logical channel (or DRB) that is not allowed to be transmitted via SDT (small data transmission) in RRC_INACTIVE (e.g. the logical channel (or DRB) is not configured for small data transmission) (e.g. non-SDT data). The new data may belong to a logical channel with higher priority than the priority of any logical channel containing available UL data which belong to any Logical Channel Group (LCG). The new data may belong to a SRB (e.g. the new data is an upper layer signaling, RRC message, or NAS message).

The determination of the event mentioned above may be applied in RRC_INACTIVE. The determination of the event mentioned above may be applied in RRC_CONNECTED. The determination of the event mentioned above may not be applied in RRC_CONNECTED.

Considering that the event occurs while the UE is in RRC_INACTIVE, the determination of the event may be different from how the UE determines the event in RRC_CONNECTED state. In RRC_CONNECTED state, if new data is arrived, the UE may trigger a BSR (if the data belongs to a logical channel with higher priority than the priority of any logical channel containing available UL data which belong to any LCG, or none of the logical channels which belong to an LCG contains any available UL data, as specified in NR MAC specification (3GPP TS 38.321).

Considering that the event occurs while the UE is in RRC_INACTIVE, the UE handling may be different from how the UE handles the event while it occurs in RRC_CONNECTED state.

In 3GPP R2-2007449, it is proposed that radio link monitoring (RLM) and beam failure detection (BFD) are not supported in SDT procedure. Moreover, it is also proposed that the RACH failure, consistent uplink LBT failure and RLC failure are ignored by RRC during INACTIVE data transmission (i.e. SDT procedure). The reason is due to relatively short time duration of user plane data transmission in RRC_INACTIVE during a SDT procedure, and also SDT is not designed for the service with strict latency requirement.

However, due to the support of subsequent transmissions in RRC_INACTIVE, the time duration of a SDT procedure may depend on how much UL/DL data to be transferred and how much UL/DL resources can be scheduled to the UE at the moment, which should be under network control. In addition, some event (such as beam failure) could occur in a very short time (e.g. tens of ms). At least some deterministic handling of the event should be specified. Otherwise it would be difficult for NW to understand the status of the UE.

To solve the issue, the UE performs one or more of the following actions in response to occurrence of one or more of the following events.

In one example, if a UE detects beam failure during a SDT procedure (or subsequent data transmission in the SDT procedure), the UE may suspend the ongoing transmission (e.g. small data transmission or subsequent transmission). The UE may suspend the SDT procedure (e.g. in response to the detection). In response to the beam failure detection, the UE may inform NW about the beam failure (e.g. initiate a beam failure recovery, initiate a RA procedure, and/or transmit an indication of beam failure such as BFR MAC CE). If the beam failure recovery is successful, the UE may resume the ongoing transmission. If the beam failure recovery if not successful, the UE may stop the SDT procedure.

In one example, if a UE detects radio link failure during a SDT procedure (or subsequent data transmission in the SDT procedure), the UE may stop the ongoing transmission (e.g. small data transmission or subsequent transmission). The UE may stop the SDT procedure (e.g. in response to the detection). The UE may perform a cell selection (e.g. in response to the detection). The UE may initiate a RRC resume procedure (e.g. in a newly selected cell, the cell is a NR cell, without small data transmission). The UE may go to RRC_IDLE (e.g. if no cell can be selected, if the selected cell is not a NR cell).

In one example, if a measurement result of a UE becomes too bad (e.g. measurement result below a threshold, measurement result below a threshold for a period of time, an indication of poor radio condition is received, and/or an indication of poor radio condition is received for a number of times) during a SDT procedure (or subsequent data transmission in the SDT procedure), the UE may suspend (or stop) the ongoing transmission (e.g. small data transmission or subsequent transmission). The UE may suspend (or stop) the SDT procedure. The UE may attempt to find a suitable cell (or qualified beam). The UE may fallback (or initiate) a RRC resume procedure (e.g. without small data transmission).

The events mentioned above may include at least one of the following events or sub-events:

Beam failure detection (or beam failure recovery)

The UE may consider beam failure is detected if a counter (e.g. BFI_COUNTER as discussed in 3GPP TS 38.321) reaches (or exceeds) its maximum value (e.g. beamFailureInstanceMaxCount as discussed in 3GPP TS 38.321). The counter may be incremented if an indication is received (e.g. beam failure instance from a lower layer). The counter may be reset if beam problem is recovered (e.g. no indication is received for a period of time).

The UE may consider beam failure is detected if a timer is expired. The timer may be started if an indication is received (e.g. beam failure instance from a lower layer). The timer may be stopped if beam problem is recovered (e.g. another indication such as beam recovery indication is received).

The UE may consider beam failure is detected if a measurement result becomes bad (e.g. below a threshold, below a threshold for a period of time). The measurement result may be with respect to a specific beam. The threshold may be a configured value. The threshold may be used to determine whether small data transmission is allowed. The measurement may be RSRP, RSRQ, and/or SINR. The specific beam may be the beam used for PDCCH monitoring, data transmission and/or data reception.

The UE may consider beam failure is detected if a beam failure indication is received. The indication may be received from a lower layer (e.g. PHY).

Combinations of the above determination may be possible.

Radio link failure

The UE may consider radio link failure is detected if a timer is expired (e.g. T310, T312, or the like). The timer may be started if a physical layer problem is detected (e.g. a consecutive number of out-of-sync indications is received). The timer may be stopped if a physical layer problem is recovered (e.g. a consecutive number of in-sync indications is received).

The UE may consider radio link failure is detected if a random access problem is detected (e.g. random access problem indication is received). The random access problem may be indicated (or determined) if the number of RA preamble transmission exceeds (or reaches) a threshold (e.g. a configured number).

The UE may consider radio link failure is detected if a RLC problem is detected (e.g. a maximum number of RLC retransmissions has been reached). The RLC problem may be indicated (or determined) if the number of maximum number of RLC retransmission is exceeded (or reached).

The UE may consider radio link failure is detected if consistent LBT failure is detected (e.g. consistent uplink LBT failure indication is received).

The UE may consider radio link failure if a radio link failure indication is received. The radio link failure indication may be received from a lower layer (e.g. PHY).

The UE may consider radio link failure if a measurement result becomes bad (e.g. below a threshold, below a threshold for a period of time). The measurement result may be with respect to a serving cell (e.g. PCell), a camping cell, or a connected cell. The threshold may be a configured value. The threshold may be used to determine whether small data transmission is allowed. The measurement may be RSRP, RSRQ, and/or SINR.

Combinations of the above determination may be possible.

The determination of the event mentioned above may be applied in RRC_INACTIVE. The determination of the event mentioned above may be applied in RRC_CONNECTED. The determination of the event mentioned above may not be applied in RRC_CONNECTED.

Considering that the event occurs while the UE is in RRC_INACTIVE, the determination of the event may be different from how the UE determines the event in RRC_CONNECTED state.

In RRC_CONNECTED state, if beam failure is detected, the UE may initiate a RA procedure for BFR (if the serving cell is not a SCell) or trigger a BFR (MAC CE) for the serving cell (if the serving cell is a SCell).

In RRC_CONNECTED state, if radio link failure occurs, the UE may initiate a RRC connection re-establishment procedure (as specified in NR RRC specification—3GPP TS 38.331), initiate a MCG failure information procedure (as specified in NR RRC specification—3GPP TS 38.331), initiate a SCG failure information procedure (as specified in NR RRC specification—3GPP TS 38.331), or go to RRC_IDLE (if AS security is not activated).

The actions mentioned above may include at least one of the following actions or sub-actions:

Stop (or abort) the current SDT procedure (and/or RRC resume procedure)

The UE may stop (or abort) the ongoing SDT procedure. The UE may stop (or abort) the ongoing RRC procedure (e.g. RRC resume procedure). The UE may release (or stop applying) a SDT related configuration. For example, the UE may stop a SDT procedure in response to new data arrival (e.g. non-SDT data arrival).

Stop a timer of controlling the duration of SDT procedure/subsequent transmission (and/or RRC resume procedure) (e.g. T319)

The UE may stop a (first) timer of controlling the duration of SDT procedure. The UE may stop a (second) timer of controlling the duration of RRC resume procedure. The UE may stop a (third) timer of controlling the duration of subsequent transmission (e.g. in a SDT procedure). The UE may stop a RRC timer T319. The timer may be a RRC timer T319.

For example, the UE may stop a timer of controlling duration of SDT procedure in response to new data arrival (e.g. non-SDT data arrival).

Stop (or suspend) the ongoing transmission (e.g. subsequent transmissions)

The UE may stop (or suspend) the ongoing transmission. The UE may stop (or suspend) the subsequent transmissions. The UE may stop (or suspend) the small data transmission. The UE may clear (or suspend/deactivate/release) a configured grant for the ongoing transmission. The UE may clear (or suspend/deactivate/release) a configured grant for subsequent transmissions. The UE may have ongoing transmission (e.g. small data transmission and/or subsequent transmissions). The UE may flush a buffer (e.g. soft buffer, Hybrid Automatic Repeat Request (HARM) buffer, Msg3 buffer, MsgA buffer) used for the (ongoing) transmission. The UE may resume the (ongoing) transmission in response to (or upon) beam failure is recovered (successfully). For example, the UE may stop (ongoing) subsequent transmission(s) duration a SDT procedure in response to new data arrival (e.g. non-SDT data arrival).

Stop monitoring Physical Downlink Control Channel (PDCCH)—e.g. for Cell Radio Network Temporary Identifier (C-RNTI) and/or Configured Scheduling Radio Network Temporary Identifier (CS-RNTI)

The UE may stop monitoring PDCCH. The UE may stop monitoring PDCCH for C-RNTI. The UE may stop monitoring PDCCH for CS-RNTI. The UE may stop monitoring PDCCH for dynamic UL grant and/or DL assignment.

Indicate the occurrence of the event to NW (e.g. initiate an indication or report to NW)

The UE may indicate the occurrence of the event to NW. The UE may generate an indication (or report). The UE may provide an indication (or report) to NW.

The indication may indicate the occurrence of the event. The indication may be explicit or implicit. The indication may be a RRC message, MAC control element, or a Physical layer (PHY) signaling. The indication may be a Random Access (RA) preamble, and/or a Msg during a RA procedure. The indication may be a Buffer Status Report (BSR), Scheduling Request (SR), and/or Physical Uplink Control Channel (PUCCH) signaling. The indication may be a failure report.

For example, the UE may transmit a RRC message to NW in response to new data arrival (e.g. non-SDT data arrival).

Initiate a RA (or SR) procedure (which may serve for a specific purpose)

The UE may initiate a random access (RA) procedure (as discussed in 3GPP TS 38.321). The UE may initiate a scheduling request (SR) procedure (as discussed in 3GPP TS 38.321). The RA or SR procedure may serve for a specific purpose, e.g. beam failure recovery, small data transmission. The UE may be configured with the resources for the specific purpose, e.g. beam failure recovery, small data transmission. The UE may attempt to find a suitable beam (e.g. best beam such as with best radio quality, qualified beam with radio quality above a threshold) for communication (e.g. for PDCCH monitoring, for Physical Downlink Shared Channel (PDSCH) or Physical Uplink Shared Channel (PUSCH) transmission) with NW.

For example, the UE may initiate a random access procedure in response to new data arrival (e.g. non-SDT data arrival).

Initiate (or fallback to) RRC resume procedure (with or without small data transmission)

The UE may initiate a RRC resume procedure. The UE may initiate a RRC resume procedure with small data transmission. The UE may initiate a RRC resume procedure without small data transmission (as discussed in 3GPP TS 38.331).

For example, the UE may initiate a RRC resume procedure in response to new data arrival (e.g. non-SDT data arrival).

Perform a cell selection or reselection

The UE may perform a cell selection to find a suitable cell (e.g. before initiating a RRC resume procedure). The UE may perform a cell reselection. If no cell can be selected, the UE may go to RRC_IDLE. If a suitable NR cell is selected, the UE may stay in RRC_IDLE.

Go to RRC IDLE state (and/or the actions upon entering RRC IDLE)

The UE may go to RRC_IDLE state. The UE may enter RRC_IDLE from RRC_INACTIVE. The UE may discard the stored UE context (e.g. UE Inactive AS context). The UE may discard the security key(s). The UE may release radio resources (e.g. RLC entity, BAP entity, PDCP entity, SDAP, established RBs, MAC configuration).

Stay in RRC INACTIVE state

The UE may stay in RRC_INACTIVE state. The UE may store (or replace) the current configuration in a UE context (e.g. UE Inactive AS context). The current configuration may include: security key(s), C-RNTI, CS-RNTI, and/or cell identity. The UE may suspend RRC connection. The UE may suspend at least a radio bearer. The radio bearer may include: DRB, SRB, all DRBs, SRB1, SRB2, and/or SRBs other than SRB0.

Reset MAC

The UE may reset MAC (as discussed in 3GPP TS 38.321). The UE may perform some or all of action(s) for MAC reset The UE may discard the stored UE context (e.g. UE Inactive AS context). The UE may stop at least a running timer (or all timers) in MAC The UE may discard the stored UE context (e.g. UE Inactive AS context). The UE may consider a time alignment timer as expired.

The UE may flush a Msg3 or MsgA buffer. The UE may cancel a triggered SR or BSR procedure. The UE may flush a (or all) soft buffer for a DL HARQ process. The UE may flush a (or all) HARQ buffer. The UE may reset a counter (e.g. BFT_COUNTER, LBT_COUNTER) in MAC (as discussed in 3GPP TS 38.321).

The UE may clear a (or any) configured downlink assignment and/or configured uplink grant. The UE may release PUCCH, SRS, and/or PUSCH resource for semi-persistent CSI reporting. For example, the UE may perform MAC reset in response to new data arrival (e.g. non-SDT data arrival).

While some of the action(s) are performed, some of the other action(s) mentioned above may not be performed. Combination(s) of the above event(s) and/or action(s) are possible.

For example, in response to occurrence of event A, the UE could perform actions A and B, or the UE could perform action A but not B. For example, in response to occurrence of event A, the UE could perform action A. And in response to occurrence of event B, the UE may not perform action A. Event A could be any of the events (or sub-events) mentioned above. Action A or B could be any of the actions (or sub-actions) mentioned above.

Small data transmission (or SDT) may be referred to a SDT procedure. Small data transmission (or SDT) may be referred to a time period where small data transmission takes place. Small data transmission (or SDT) may be referred to a transmission with small data while the UE is in RRC_INACTIVE.

Subsequent transmission (or subsequent data transmission) may be referred to a time period where subsequent transmission takes place (e.g. after the first UL/DL transmission in a SDT procedure). Subsequent transmission (or subsequent data transmission) may be referred to a transmission of subsequent transmission while the UE is in RRC_INACTIVE (after the first UL/DL transmission in a SDT procedure).

The UE may have data available for transmission. The UE may have data allowed to be transmitted in RRC_INACTIVE. The UE may be in RRC_INACTIVE state. The UE may be in RRC_IDLE state. The UE may be in RRC_CONNECTED state.

The above implementations could be applicable for (and/or supported by) Reduced Capability NR Device (or namely NR_Light device). The above implementations could be applicable for (and/or supported by) normal NR Device.

The UE may initiate the small data transmission procedure on a Serving Cell other than the last (Primary) Serving Cell in RRC_CONNECTED state. The UE may initiate the small data transmission procedure on the same Serving Cell as the last (Primary) Serving Cell in RRC_CONNECTED state.

Figure 17:
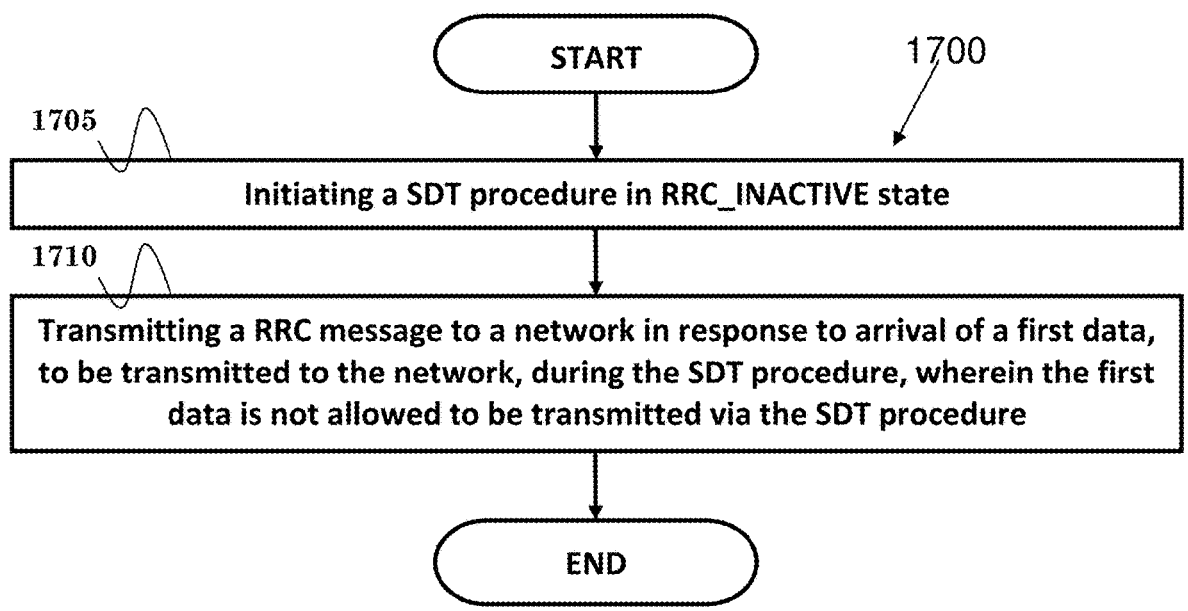
FIG. 17 is a flow chart according to one exemplary embodiment.

FIG. 17 is a flow chart 1700 according to one exemplary embodiment from the perspective of a UE. In step 1705, the UE initiates a SDT procedure in RRC_INACTIVE state. In step 1710, the UE transmits a RRC message to a network in response to arrival of a first data, to be transmitted to the network, during the SDT procedure, wherein the first data is not allowed to be transmitted via the SDT procedure. In one embodiment, the first data may belong to a LCH or a DRB that is not configured for SDT.

In one embodiment, the UE could initiate a RRC resume procedure not for SDT in response to the arrival of the first data. The UE could continue the SDT procedure in response to the arrival of the first data. The UE could stop the SDT procedure in response to the arrival of the first data. The UE could continue the SDT procedure if the UE detects that a second data becomes available for transmission, wherein the second data is allowed to be transmitted via the SDT procedure. The UE could stop a timer of controlling duration of the SDT procedure in response to the arrival of the first data. The UE could initiate a random access procedure in response to the arrival of the first data. The UE could reset MAC in response to the arrival of the first data.

In one embodiment, the SDT procedure could be a RRC resume procedure for SDT.

Referring back to FIGS. 3 and 4, in one exemplary embodiment of a UE, the UE 300 includes a program code 312 stored in the memory 310. The CPU 308 could execute program code 312 to enable the UE (i) to initiate a SDT procedure in RRC_INACTIVE state, and (ii) to transmit a RRC message to a network in response to arrival of a first data, to be transmitted to the network, during the SDT procedure, wherein the first data is not allowed to be transmitted via the SDT procedure. Furthermore, the CPU 308 can execute the program code 312 to perform all of the above-described actions and steps or others described herein.

Figure 18:
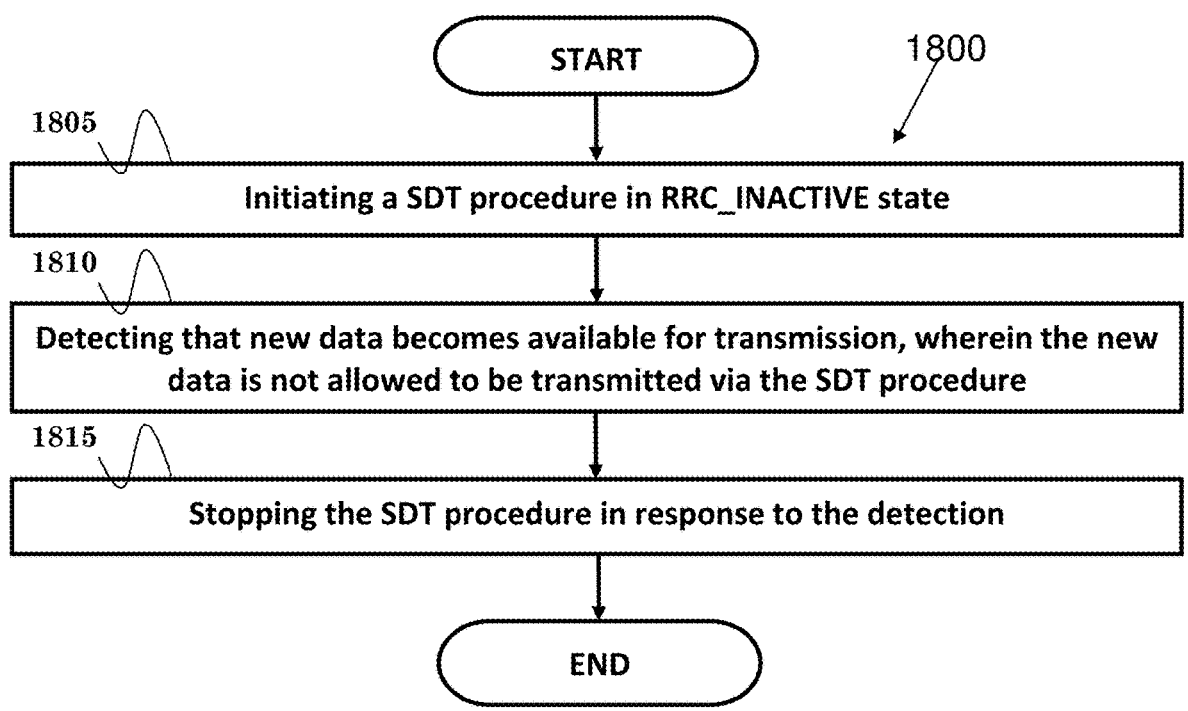
FIG. 18 is a flow chart according to one exemplary embodiment.

FIG. 18 is a flow chart 1800 according to one exemplary embodiment from the perspective of a UE. In step 1805, the UE initiates a SDT procedure in RRC_INACTIVE state. In step 1810, the UE detects that new data becomes available for transmission, wherein the new data is not allowed to be transmitted via the SDT procedure. In step 1815, the UE stops the SDT procedure in response to the detection.

In one embodiment, the new data may have higher priority than (any) data (in the buffer) to be transmitted during the SDT procedure. Furthermore, the new data may belong to a logical channel that is not configured to use SDT.

In one embodiment, the UE could initiate a RRC resume procedure in response to the detection. Furthermore, the UE could continue the SDT procedure if the new data does not have higher priority than (any) data (in the buffer) to be transmitted during the SDT procedure.

Referring back to FIGS. 3 and 4, in one exemplary embodiment of a UE, the UE 300 includes a program code 312 stored in the memory 310. The CPU 308 could execute program code 312 to enable the UE (i) to initiate a SDT procedure in RRC_INACTIVE state, (ii) to detect that new data becomes available for transmission, wherein the new data is not allowed to be transmitted via the SDT procedure, and (iii) to stop the SDT procedure in response to the detection. Furthermore, the CPU 308 can execute the program code 312 to perform all of the above-described actions and steps or others described herein.

Figure 19:
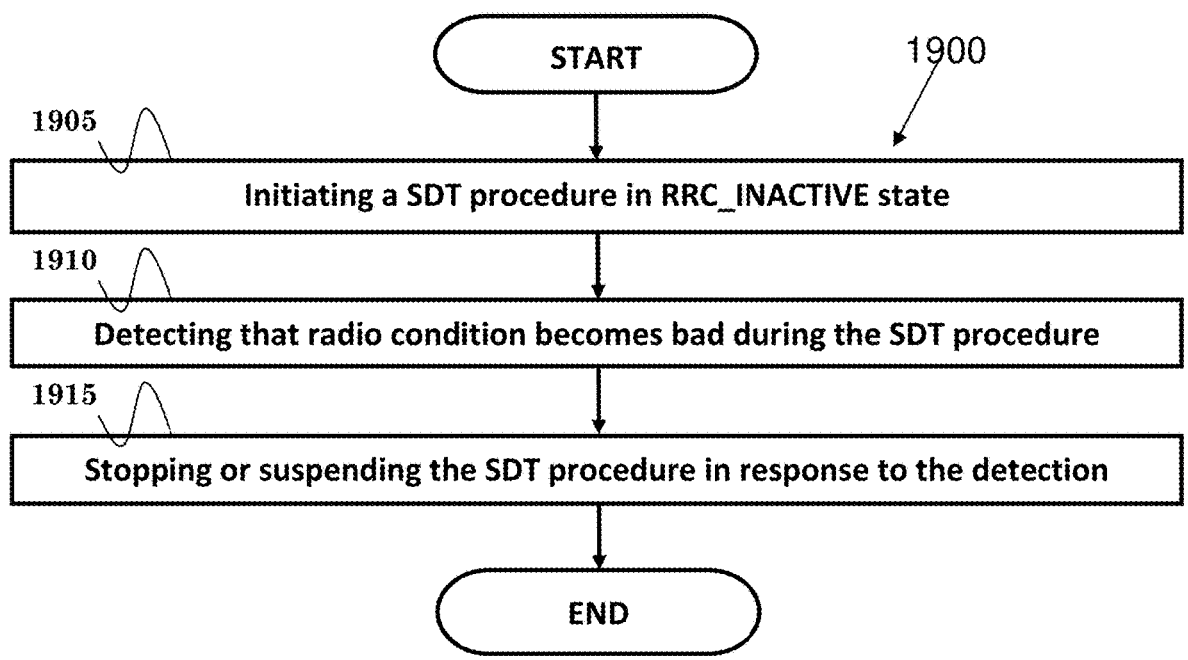
FIG. 19 is a flow chart according to one exemplary embodiment.

FIG. 19 is a flow chart 1900 according to one exemplary embodiment from the perspective of a UE. In step 1905, the UE initiates a SDT procedure in RRC_INACTIVE state. In step 1910, the UE detects that radio condition becomes bad during the SDT procedure. In step 1915, the UE stops or suspends the SDT procedure in response to the detection.

In one embodiment, the UE could detect that radio condition becomes bad by a measurement result below a threshold. More specifically, the UE could detect that radio condition becomes bad by a measurement result below a threshold for a period of time. Alternatively, the UE could detect that radio condition becomes bad by beam failure detection or by radio link failure.

Referring back to FIGS. 3 and 4, in one exemplary embodiment of a UE, the UE 300 includes a program code 312 stored in the memory 310. The CPU 308 could execute program code 312 to enable the UE (i) to initiate a SDT procedure in RRC_INACTIVE state, (ii) to detect that radio condition becomes bad during the SDT procedure, and (iii) to stop or suspend the SDT procedure in response to the detection. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE), comprising:
initiating a Small Data Transmission (SDT) procedure in RRC_INACTIVE state; and
transmitting a Radio Resource Control (RRC) message to a network in response to arrival of a new data, to be transmitted to the network, during the SDT procedure, wherein the new data belongs to a data radio bearer (DRB) that is not configured for SDT.

2. The method of claim 1, wherein the RRC message indicates to the network about the arrival of the new data that belongs to the DRB that is not configured for SDT.

3. The method of claim 1, further comprising:
the UE initiates a RRC resume procedure not for SDT in response to the arrival of the new data.

4. The method of claim 1, further comprising:
the UE continues the SDT procedure in response to the arrival of the new data.

5. The method of claim 1, further comprising:
the UE stops the SDT procedure in response to the arrival of the new data.

6. The method of claim 1, further comprising:
the UE continues the SDT procedure if the UE detects that a second data becomes available for transmission, wherein the second data is allowed to be transmitted via the SDT procedure.

7. The method of claim 1, further comprising:
the UE stops a timer of controlling duration of the SDT procedure in response to the arrival of the new data.

8. The method of claim 1, further comprising:
the UE initiates a random access procedure in response to the arrival of the new data.

9. The method of claim 1, further comprising:
the UE resets Medium Access Control (MAC) in response to the arrival of the new data.

10. The method of claim 1, wherein the SDT procedure is a RRC resume procedure for SDT.

11. A User Equipment (UE), comprising:
a control circuit;
a processor installed in the control circuit; and
a memory installed in the control circuit and coupled to the processor;
wherein the processor is configured to execute a program code stored in the memory to:
initiate a Small Data Transmission (SDT) procedure in RRC_INACTIVE state; and
transmit a Radio Resource Control (RRC) message to a network in response to arrival of a new data, to be transmitted to the network, during the SDT procedure, wherein the new data belongs to a data radio bearer (DRB) that is not configured for SDT.

12. The UE of claim 11, wherein the RRC message indicates to the network about the arrival of the new data that belongs to the DRB that is not configured for SDT.

13. The UE of claim 11, wherein the processor is further configured to execute a program code stored in the memory to:
initiate a RRC resume procedure not for SDT in response to the arrival of the new data.

14. The UE of claim 11, wherein the processor is further configured to execute a program code stored in the memory to:
continue the SDT procedure in response to the arrival of the new data.

15. The UE of claim 11, wherein the processor is further configured to execute a program code stored in the memory to:
stop the SDT procedure in response to the arrival of the new data.

16. The UE of claim 11, wherein the processor is further configured to execute a program code stored in the memory to:
continue the SDT procedure if the UE detects that a second data becomes available for transmission, wherein the second data is allowed to be transmitted via the SDT procedure.

17. The UE of claim 11, wherein the processor is further configured to execute a program code stored in the memory to:
stop a timer of controlling duration of the SDT procedure in response to the arrival of the new data.

18. The UE of claim 11, wherein the processor is further configured to execute a program code stored in the memory to:
initiate a random access procedure in response to the arrival of the new data.

19. The UE of claim 11, wherein the processor is further configured to execute a program code stored in the memory to:
reset Medium Access Control (MAC) in response to the arrival of the first new data.

20. The UE of claim 11, wherein the SDT procedure is a RRC resume procedure for SDT.

* * * * *